(12) United States Patent
Kim et al.

(10) Patent No.: US 7,898,980 B2
(45) Date of Patent: Mar. 1, 2011

(54) METHOD AND APPARATUS FOR SUPPORTING VOICE SERVICE THROUGH RADIO CHANNEL IN MOBILE TELECOMMUNICATION SYSTEM

(75) Inventors: Seong-Hun Kim, Suwon-si (KR); Gert Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 1103 days.

(21) Appl. No.: 11/239,641

(22) Filed: Sep. 30, 2005

(65) Prior Publication Data

US 2006/0067324 A1 Mar. 30, 2006

(30) Foreign Application Priority Data

Sep. 30, 2004 (KR) .................. 10-2004-0077875
Oct. 13, 2004 (KR) .................. 10-2004-0081950

(51) Int. Cl.
*H04L 12/28* (2006.01)
(52) U.S. Cl. ...................... 370/254; 370/470
(58) Field of Classification Search ............. 370/503, 370/465, 468, 470–472
See application file for complete search history.

(56) References Cited

U.S. PATENT DOCUMENTS

| | | | | |
|---|---|---|---|---|
| 6,567,375 B2* | 5/2003 | Balachandran et al. | ...... | 370/204 |
| 6,845,095 B2* | 1/2005 | Krishnarajah et al. | ....... | 370/349 |
| 7,072,336 B2* | 7/2006 | Barany et al. | ............... | 370/389 |
| 7,386,000 B2* | 6/2008 | Lopponen et al. | ........... | 370/433 |

(Continued)

FOREIGN PATENT DOCUMENTS

EP    1 030 484 A2    8/2000

(Continued)

OTHER PUBLICATIONS

IMTC Packet-Switched Streaming Activity Group, "Specification of PSS-AG Basic Tests", Draft 0.3, Mar. 5, 2003, pp. 1-26.

(Continued)

*Primary Examiner*—Ricky Ngo
*Assistant Examiner*—Ben H Liu
(74) *Attorney, Agent, or Firm*—Roylance, Abrams, Berdo and Goodman, LLP

(57) ABSTRACT

A method and an apparatus for supporting a voice service through a radio channel in a mobile telecommunication system are provided, wherein the method includes the steps of determining a voice codec mode, byte-alignment information about a byte-alignment scheme of a voice packet, a requested bandwidth and a codec type used for processing a voice call in a procedure of establishing a call between a terminal and a core network, forming a packet data protocol context establishing message including the codec type, the byte-alignment information and the voice codec mode in order to establish a bearer for a packet call, and transmitting the formed packet data protocol context establishing message to the core network from the terminal. The method further includes the steps of transmitting a radio bearer establishing message from an access network to the terminal, the radio bearer establishing message including a radio link packet size set determined based on the codec type, the byte-alignment information and the voice codec mode, the access network connecting the terminal with the core network.

30 Claims, 18 Drawing Sheets

U.S. PATENT DOCUMENTS

| | | | |
|---|---|---|---|
| 7,440,744 B2* | 10/2008 | Muniere et al. | 455/403 |
| 2002/0034166 A1* | 3/2002 | Barany et al. | 370/329 |
| 2002/0062379 A1* | 5/2002 | Widegren et al. | 709/227 |
| 2002/0093936 A1* | 7/2002 | Chuah | 370/349 |
| 2002/0120749 A1* | 8/2002 | Widegren et al. | 709/227 |
| 2002/0191556 A1 | 12/2002 | Krishnarajah et al. | |
| 2003/0081592 A1* | 5/2003 | Krishnarajah et al. | 370/352 |
| 2003/0103457 A1* | 6/2003 | Moran et al. | 370/230 |
| 2003/0152057 A1 | 8/2003 | Chou et al. | |
| 2003/0156578 A1* | 8/2003 | Bergenlid et al. | 370/352 |
| 2003/0172160 A9* | 9/2003 | Widegren et al. | 709/226 |
| 2004/0057412 A1* | 3/2004 | Curcio et al. | 370/341 |
| 2004/0141572 A1* | 7/2004 | Johnson et al. | 375/350 |
| 2005/0041578 A1* | 2/2005 | Huotari et al. | 370/229 |

FOREIGN PATENT DOCUMENTS

| | | |
|---|---|---|
| GB | 2 399 716 A | 9/2004 |
| JP | 2004-282197 | 10/2004 |

OTHER PUBLICATIONS

Global Systems for Mobile Communications, "3rd Generation Partnership Project Technical Specification Group GERAN Support for Voice Optimization for The IMS in the GERAN (Release 5)", 3GPP TR 43.900, V.1.0.0. (Aug. 2001), pp. 1-35.

* cited by examiner

METHOD AND APPARATUS FOR SUPPORTING VOICE SERVICE THROUGH RADIO CHANNEL IN MOBILE TELECOMMUNICATION SYSTEM

CROSS-REFERENCE TO RELATED APPLICATIONS

This application claims the benefit under 35 U.S.C. §119(a) of Korean Patent Application No. 10-2004-0077875 entitled "Method And Apparatus For Supporting Voice Service Through Radio Channel In Mobile Telecommunication System" filed in the Korean Intellectual Property Office on Sep. 30, 2004, and Korean Patent Application No. 10-2004-0081950 filed in the Korean Intellectual Property Office on Oct. 13, 2004, the entire disclosure of each is hereby incorporated by reference.

BACKGROUND OF THE INVENTION

1. Field of the Invention

The present invention relates to a method and an apparatus for providing a voice service through a packet network in a mobile communication system. More particularly, the present invention relates to a method and an apparatus for efficiently setting the size of packet data according to a voice service.

2. Description of the Related Art

Recently, mobile communication systems are developing high speed and high quality wireless data packet communication systems in order to provide data services and multimedia services beyond initial voice-based services. The universal mobile telecommunication service (UMTS) system (which is the 3rd mobile communication system) employing a wideband code division multiple access (W-CDMA) scheme based on the global system for mobile communications (GSM) and the general packet radio services (GPRS), which are European Mobile Communication Systems, consistently provides a service allowing users employing mobile phones or computers to transmit packet-based text or digitalized voice data, video and multimedia data at a high speed of at least 2 Mbps, regardless of the locations of the users.

This UMTS system employs an access concept such as a packet switching scheme based on an packet protocol including Internet Protocol (IP). The third generation partnership project (3GPP) performing standardization work for such a UMTS communication system has further proposed a plan for supporting Voice over Internet protocol (VoIP) communication.

The VoIP denotes a communication scheme for making a voice frame generated from a voice codec into an Internet Protocol/User Datagram Protocol/Real-time Transport Protocol (IP/UDP/RTP) packet to be transmitted. If the VoIP is used, a voice service may be provided through the packet network.

FIG. 1 schematically illustrates the structure of a wireless access network (UTRAN) of a typical asynchronous mobile communication system (UMTS). The mobile communication system includes a core network (CN) 100 and a plurality of radio network subsystems (RNSs) 110 and 120. The RNSs 110 and 120 construct an UMTS Terrestrial Radio Access Network (UTRAN). The CN 100 includes a serving GPRS supporting node (SGSN) (not shown) and a gateway GPRS support node (GGSN) (not shown) in order to connect the UTRAN to a packet data network such as the Internet (not shown).

The RNSs 110 and 120 include radio network controllers (RNCs) 111 and 112, and a plurality of Node Bs 115, 113, 114 and 116. In detail, the RNS 110 includes the RNC 111 and the Node Bs 115 and 113, and the RNS 120 includes the RNC 112 and the Node Bs 114 and 116. The RNCs 111 and 112 are divided into a serving RNC, a drift RNC and a control RNC according to the roles of the RNCs. The serving RNC manages information of each UE and provides data transmission together with the CN. The drift RNC directly makes wireless connection with a UE. The control RNC controls wireless resources of each Node B.

The RNCs 111 and 112 are connected with the Node Bs 115, 113, 114 and 116 through an interface denoted as "Iub", and the connection between the RNC 111 and 112 is achieved through an interface denoted as "Iur". In addition, although not shown in FIG. 1, the UE 130 is connected with the UTRAN through an interface denoted as "Uu".

The RNCs 111 and 112 allocate radio resources to the Node Bs 115 and 113 and Node Bs 114 and 116 managed by the RNCs 111 and 112, respectively, and the Node Bs 115, 113, 114 and 116 actually provide the UE, or terminal 130 with radio resources allocated from the RNCs 111 and 112. The radio resources are provided according to cells, and radio resources provided by each Node B are used for a specific cell managed by a corresponding Node B.

The terminal 130 establishes a radio channel by using radio resources for specific cells managed by the Node Bs 115, 113, 114 and 116, and makes data communication through the established radio channel. Since the terminal 130 recognizes only a physical channel formed according to cells, the discrimination between a cell and a Node B has little significance. Accordingly, in the following description, the cell and the Node B will be used without discrimination there between.

FIG. 2 illustrates the structure of the mobile communication system performing the VoIP communication.

A terminal 200 includes a codec 206 for converting voice into a voice frame, an IP/UDP/RTP protocol layer 205 for making the voice frame of the codec 206 into an IP/UDP/RTP packet, a packet data convergence protocol (PDCP) layer 204 for compressing a header of the IP/UDP/RTP packet, and a radio link control (RLC) layer 203 for converting the IP/UDP/RTP packet into a format suitable for transmission through a radio channel. The terminal 200 further includes a medium access control (MAC) module 202 for delivering a packet sent from the RLC layer to the physical channel through a suitable transport channel and delivering data sent from the physical layer through a transport channel to the RLC layer through a suitable logical channel, and a physical layer (PHY) 201 for exchanging packet data with the MAC layer and the transport channel in connection with the MAC layer and the transport channel, and transmitting the packet data to a receiver through a radio channel.

Voice packet data transmitted by the terminal 200 is delivered to the RNC 220 through the PHY layer 211 of the Node B 210.

In addition, the RNC 220 includes a MAC layer 222, an RLC layer 223 and a PDCP layer 224 similarly with the terminal 200 so as to convert the received data into an original IP/UDP/RTP packet to be transmitted to a core network (CN) 230. The IP/UDP/RTP packet is transmitted to a counterpart through an IP network 240. In a terminal of the counterpart, the voice packet data is controlled and delivered in a manner substantially opposite to the above-described order.

Hereinafter, the role of the RLC layer will be described in greater detail.

Generally, the RLC layer has modes classified into an unacknowledged mode (UM), an acknowledged mode (AM), and a transparent mode (TM) according to the operation of the RLC layer. The VoIP communication is performed in the UM of the RLC layer. In the following description, the operation of the UM will be given.

A UM of the RLC layer in a transmitter forms data having a size suitable for transmission through a radio channel by performing division, concatenation or padding with respect to an RLC service data unit (RLC SDU) delivered from the upper layer, inserts information about the division/concatenation/padding into the data, and inserts a serial number into the data so as to make an RLC protocol data unit (RLC PDU). The RLC PDU is then delivered to the lower layer.

Accordingly, to deliver from the transmitter, a UM of the RLC layer in a receiver analyzes the serial number and the division/concatenation/padding information of the RLC PDU delivered from the lower layer and forms the RLC PDU into an RLC SDU to be delivered to the upper layer.

For reference, the operation of a TM of the RLC layer is achieved by delivering an RLC SDU sent from the upper layer to the lower layer as it is, or by delivering an RLC PDU sent from the lower layer to the upper layer as it is.

As described above, voice data generated from the codec 206 of the terminal 200 is converted into a VoIP packet through the IP/UDP/RTP protocol layer 205. The VoIP packet has a header compressed through the PDCP layer 204 constructed for an uplink transmission, and is made into data having a size suitable for radio channel transmission through the RLC layer 203, then channel-coded in the MAC/PHY layers 201 and 202 and transmitted through a radio channel.

The RLC PDU (wherein the PDU processed in the physical layer is called a 'Transport Block') is channel-decoded in the physical layer 211 of the Node B 210 and then transmitted to the RNC 220.

The RNC 220 transforms the RLC PDUs into a VoIP packet to be transmitted to the CN 230. The CN 230 delivers the VoIP packet to a counterpart through the IP network 240 or the PSTN 250. Downlink data transmission is achieved in a manner substantially opposite to the above-described order.

In this case, in the VoIP communication system, users who communicate with each other must use the same codecs (e.g., the codecs 206 and 244). If communication between the UMTS terminal 200 and a PSTN user is achieved, a predetermined device performs the conversion of the codec 254 between the PSTN and the UMTS CN.

FIG. 3 illustrates the structure of the conventional VoIP mobile communication system using an adaptive multi-rate codec.

Terminals 305 and 330 having AMR codecs, generate IP packets including AMR payloads 310 to be delivered to counterparts of the terminals 305 and 330 through access networks 315 and 325 and a core network 320. The access networks 315 and 325 include an RNC (not shown) and a Node B (not shown), and the core network 320 may be a GPRS support node (GSN) (not shown).

The AMR codec has a notable characteristic in that the size of a payload can be variably adjusted according to environments of a radio link. For example, the AMR codec generating a small payload under an inferior link environment, generates a large payload if the link has a superior environment. Such an adjustment of the payload size refers to the change of a codec mode. The codec mode may be changed when the receiver directs a preferred codec mode to the transmitter by using a codec mode request (CMR) field of the header attached to the AMR payload 310.

For example, if the terminal 330 recognizes the necessity of changing the codec mode, the terminal 330 sets the CMR field of the header of the AMR payload 310 to a suitable value so as to transmit the AMR payload 310 to the terminal 305.

Then, the terminal 305 adjusts the size of the payload by controlling the AMR codec to have the requested codec mode.

The AMR codec generates nine types of payloads including 56-bit payload, 112 bit-payload, 120-bit payload, 128-bit payload, 144-bit payload, 160-bit payload, 176-bit payload, 216-bit payload and 256-bit payload. The 56-bit payload among the payloads is used in a silent period; and the remaining eight payloads are each defined according to codec modes.

However, generally, the access networks 315 and 325 frequently fix the size of a packet to be used in a radio interval at a predetermined value. For example, the UTRAN frequently uses a 328-bit packet (also called a 'transport block') for a packet service.

Therefore, if the size of a packet is not changed, even though different sizes are given to an AMR payload of the packet according to the operation of the AMR codec, it is difficult to obtain a benefit according to an adaptive codec mode. That is, if the size of the packet is fixed at 328 bits even though the codec generates a 56-bit payload, an empty space in 328 bits is filled with padding bits and transmitted. Accordingly, the efficiency of radio resources may be degraded.

In addition, the $3^{rd}$ generation mobile communication system has variously defined codec in addition to the AMR codec shown in FIG. 3, and these codecs make payloads having specific sizes.

That is, if the size of a packet used in the radio channel (or link) does not match the size of a payload generated from a specific codec, the conventional technique presents a problem of degrading the efficiency of radio resource utility.

Accordingly, a need exists for a system and method for efficiently processing a voice packet through a packet network in a mobile communication system.

SUMMARY OF THE INVENTION

Accordingly, the present invention has been made to substantially solve the above-mentioned and other problems occurring in the prior art, and an object of the present invention is to provide a method and an apparatus for efficiently processing a voice packet through a packet network in a mobile communication system.

Another object of the present invention is to provide a method and an apparatus for efficiently setting the size of a packet used through a radio channel in a mobile communication system providing a voice service via a packet network.

To accomplish the above objects, a method for supporting a voice service through a radio channel in a mobile communication system is provided, the method comprising the steps of determining a voice codec mode, byte-alignment information about a byte-alignment scheme of a voice packet, a requested bandwidth and a codec type used for processing a voice call in a procedure of establishing a call between a terminal and a core network, forming a packet data protocol context establishing message including the codec type, the byte-alignment information and the voice codec mode in order to establish a bearer for a packet call, and transmitting the formed packet data protocol context establishing message to the core network from the terminal. The method further comprises the steps of transmitting a radio bearer establishing message from an access network to the terminal, wherein the radio bearer establishing message including a radio link packet size set determined based on the codec type, the byte-alignment information and the voice codec mode, the access network connecting the terminal with the core network.

According to another aspect of the present invention, a method for supporting a voice service through a radio channel in a mobile communication system is provided, the method comprising the steps of determining a voice codec mode, byte-alignment information about a byte-alignment scheme of a voice packet, a requested bandwidth and a codec type used for processing a voice call in a procedure of establishing a packet call between a terminal and a core network, and receiving from the terminal a packet data protocol context establishing message including the codec type, the byte-alignment information and the voice codec mode in order to establish a bearer for the packet call. The method further comprises the steps of forming a radio access bearer establishing message in order to establish a bearer relating to a packet data protocol context and obtaining a payload size set according to the codec type, the byte-alignment information and the voice codec mode, and transmitting a radio access bearer establishing message to an access network, which provides a service to the terminal, by inserting the payload size set into the radio access bearer establishing message.

According to still another aspect of the present invention, a method for supporting a voice service through a radio channel in a mobile communication system is provided, the method comprising the steps of, receiving from a core network, a radio access bearer establishing message including a payload size set determined between a terminal and the core network based on a voice codec mode, byte-alignment information about a byte-alignment scheme of a voice packet, a requested bandwidth and a codec type used for processing a voice call, establishing a radio access bearer according to the radio access bearer establishing message and forming a radio bearer establishing message including radio bearer configuration information based on the payload size set included in the radio access bearer establishing message. The method further comprises the steps of determining packet sizes usable in a radio link according to the payload size set included in the radio access bearer establishing message and transmitting the radio bearer establishing message to the terminal by inserting a radio link packet size set into the radio bearer establishing message, the radio link packet size set representing sizes of packets of the established radio link.

According to yet another aspect of the present invention, a device is provided for supporting a voice service through a radio channel in a mobile communication system, the device comprising a user equipment for determining a voice codec mode, byte-alignment information about a byte-alignment scheme of a voice packet, a requested bandwidth and a codec type used for processing a voice call when the voice call is established, and for transmitting a packet data protocol context establishing message including the codec type, the byte-alignment information and the voice codec. The device further comprises a core network for obtaining a payload size set based on the codec type, the byte-alignment information and the voice codec mode by receiving the packet data protocol context establishing message from the user equipment and transmitting a radio bearer establishing message including the payload size set, and an access network for determining sizes of radio link packets usable in a radio link based on the payload size set by receiving the radio bearer establishing message from the core network and transmitting to the user equipment a radio bearer establishing message including a radio link packet size set representing the determined sizes of the radio link packets.

According to yet another aspect of the present invention, a method for supporting a voice service through a radio channel in a mobile communication system is provided, the method comprising the steps of determining codec information for processing a voice call in a procedure of establishing a call between a terminal and a core network, transmitting to the terminal from the core network a packet data protocol context establishing message including the codec information and a packetization interval during which packet data is generated according to the codec information, obtaining by the core network the packetization interval based on the packet data protocol context establishing message and transmitting a radio access bearer establishing message including the packetization interval to an access network which provides a service to the terminal. The method further comprises the steps of determining by the access network a transmission time interval of a radio link used for transmitting the packet data based on the packetization interval and transmitting a radio bearer establishing message including the transmission time interval of the radio link to the terminal.

According to yet another aspect of the present invention, a device is provided for supporting a voice service through a radio channel in a mobile communication system, the device comprising a user equipment for determining codec information for processing a voice call and transmitting to a core network a packet data protocol context establishing message including the codec information and a packetization interval during which packet data is generated according to the codec information when establishing a call with the core network. The device further comprises the core network for obtaining the packetization interval from the packet data protocol context establishing message and transmitting a radio bearer establishing message including the packetization interval to an access network which provides a service to the user equipment, and the access network for determining a transmission time interval of a radio link used for transmitting the packet data based on the packetization interval and transmitting a radio bearer establishing message including the transmission time interval to the user equipment.

BRIEF DESCRIPTION OF THE DRAWINGS

The above and other objects, features and advantages of the present invention will become more apparent from the following detailed description taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Figure 1:
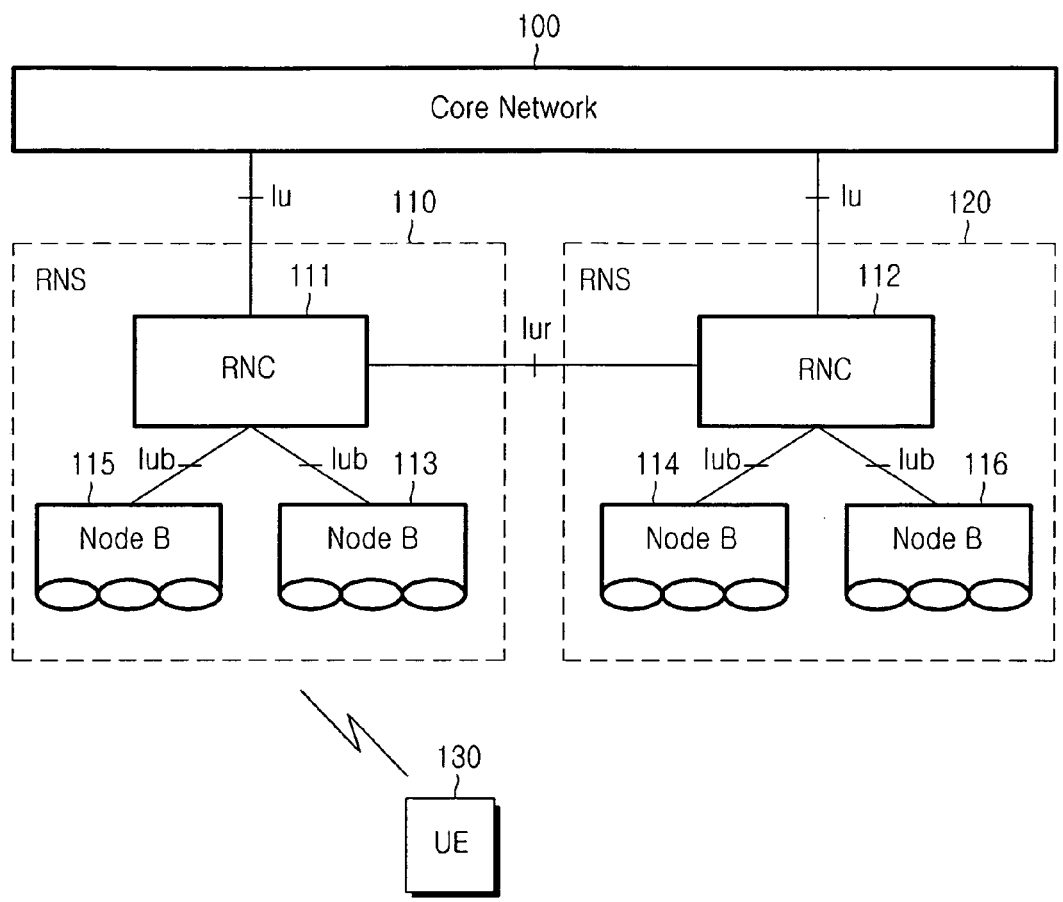
FIG. 1 schematically illustrates a structure of a wireless access network (UTRAN) of a conventional asynchronous mobile communication system (UMTS)
Figure 2:
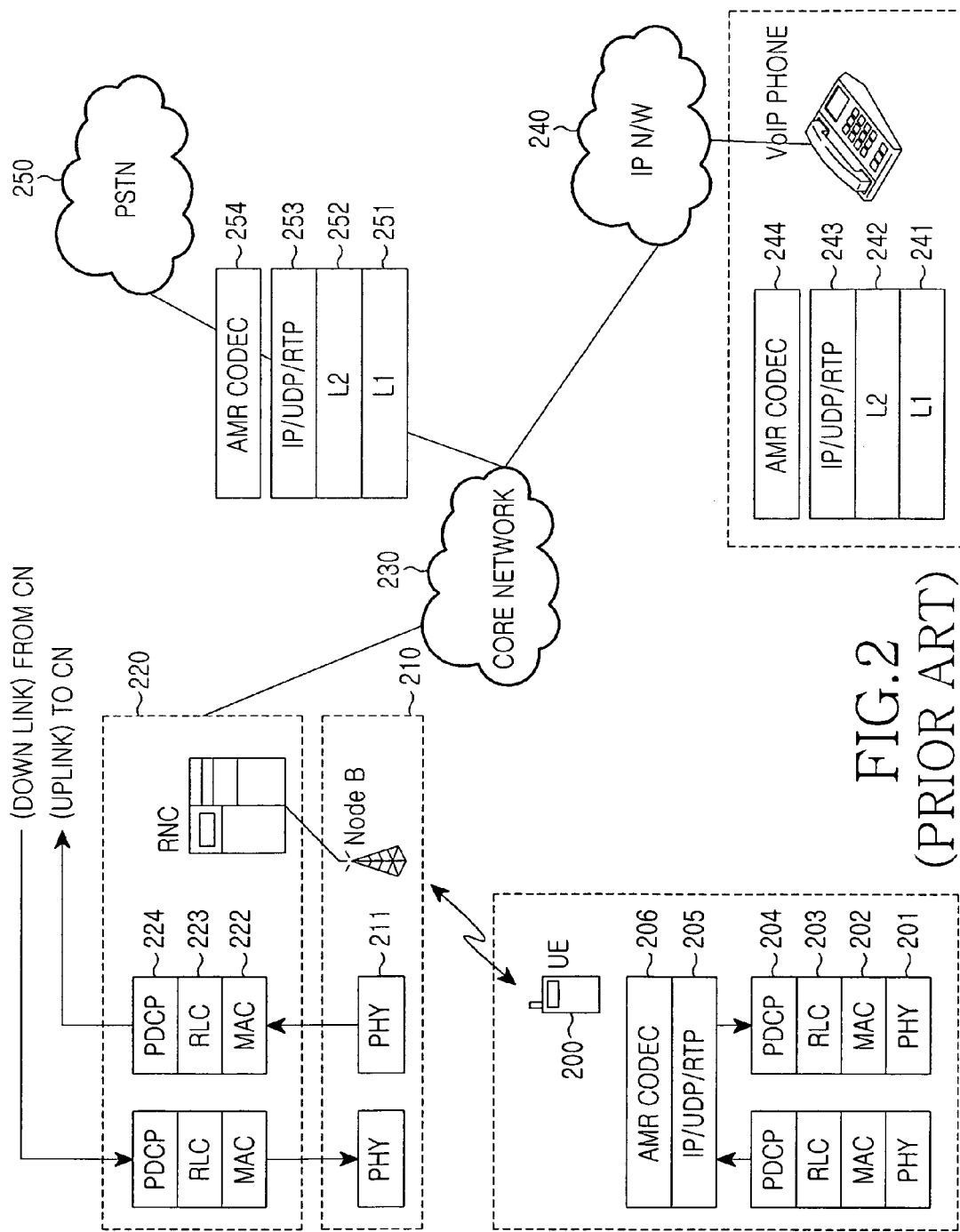
FIG. 2 illustrates a structure of a conventional mobile communication system performing a VoIP communication.

Hereinafter, exemplary embodiments of the present invention will be described in detail with reference to the accompanying drawings. Note that the same or similar components in the drawings are designated by the same reference numerals although they are shown in different drawings. In the following description of the embodiments of present invention, a detailed description of known functions and configurations incorporated herein is omitted for clarity and conciseness.

The present invention proposes a method and apparatus for reporting the type of a codec to be used for a VoIP call between a terminal and a network in a mobile communication system supporting VoIP communication, and thereby allowing the network to set the size of a packet to be used for a radio channel in consideration of the size of a payload generated from the codec such that it is possible to improve the efficiency of radio resources.

According to a first embodiment of the present invention, the preferable size of a packet is reported to an RNC through information exchange among a terminal, an SGSN and the RNC in the procedure of establishing a bearer which will process VoIP data, and the RNC uses the preferable size of the packet in the future, thereby improving the efficiency of radio resources.

According to a second embodiment of the present invention, the terminal exchanges information with the SGSN such that the terminal does not change a codec mode, thereby removing the inefficiency derived from the usage of a low codec mode.

According to a third embodiment of the present invention, a method is provided for informing the RNC, through information exchange among the terminal, the SGSN and the RNC, of information about a scheme of making an ARM packet based on bytes and information about a supported AMR codec mode and allowing the RNC to set the size of packet data through the information.

According to a fourth embodiment of the present invention, a method is provided for recognizing a packetization interval according to multimedia data through a procedure of establishing a radio bearer among the terminal, the SGSN and the RNC, and setting a transmission time interval of a packet.

First Exemplary Embodiment of the Present Invention

Figure 4:
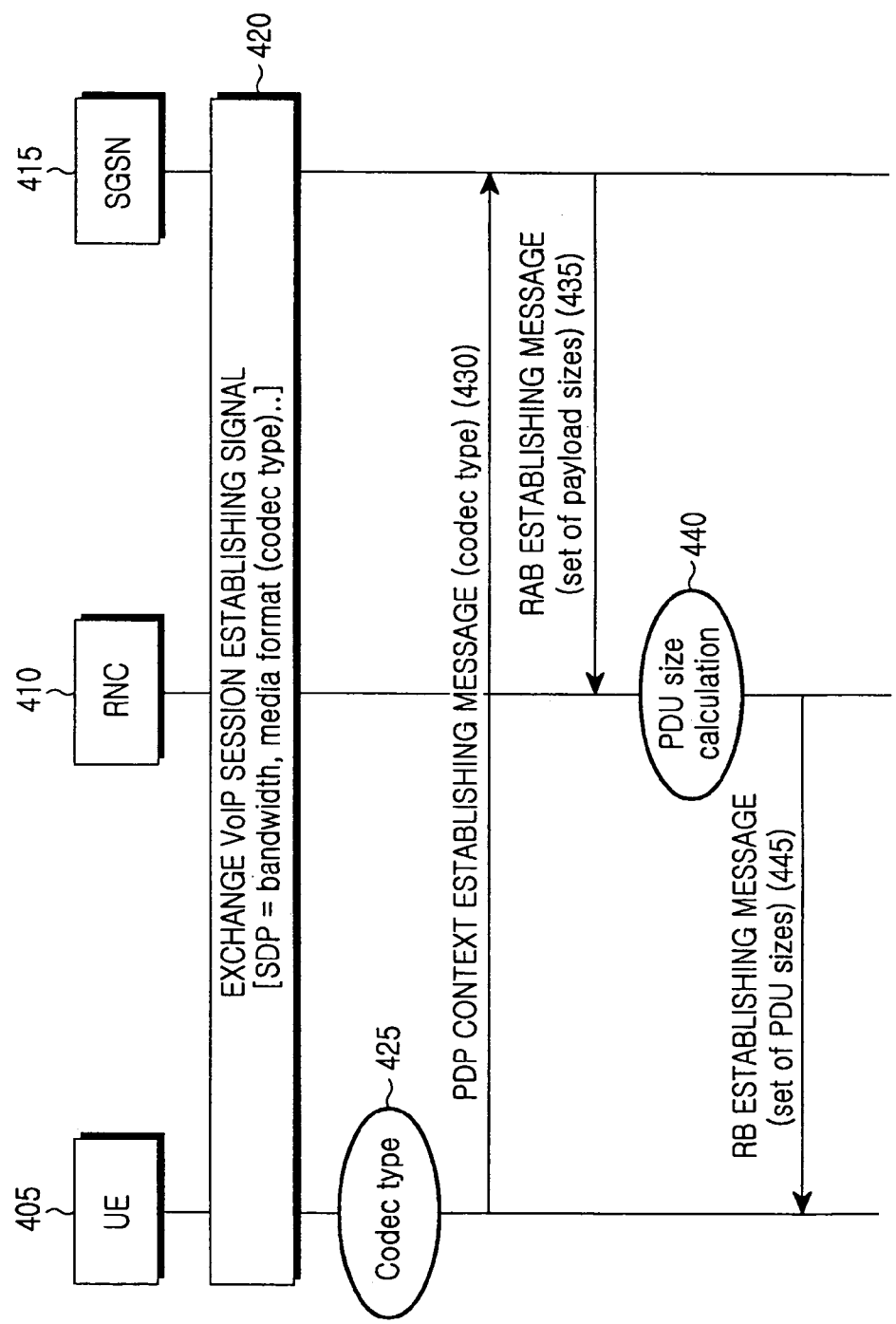
FIG. 4 is a signal flowchart of an overall network setting the size of packet data according to a first embodiment of the present invention.

FIG. 4 is a signal flowchart of an overall network setting the size of packet data according to the first embodiment of the present invention. The network comprises at least a user equipment (UE) 405, a radio network controller (RNC) 410 and a GPRS supporting node (SGSN) 415.

In step 420, the terminal 405 exchanges a VoIP session establishing message with a call controlling device (not shown) of the core network (SGSN) 415. In this case, the VoIP session may be established through a session initiation protocol (SIP). Herein, the call controlling device may be an SIP server.

The terminal 405 exchanges a predetermined message with the SIP server, thereby establishing the VoIP session. The messages for establishing the VoIP session include session description protocol (SDP) parameters, and the parameters may be parameters relating to call characteristics such as a requested bandwidth and a codec type.

In step 425, the terminal 405 recognizes codec type information through the SDP parameter of the call detected in the call establishing procedure of step 420. In step 430, the terminal 405 inserts a codec type for the call into the codec type information of a packet data protocol context (PDP) establishing message to be transmitted to the SGSN 415. The PDP context includes information relating to a specific session and is established together with a bearer which will process the session.

The information inserted into the PDP context may be requested Quality of Service (QoS) of the session or a parameter relating to security. If the SGSN 415 receives the PDP context establishing message from the terminal 405, the SGSN 415 establishes the PDP context and carries out the operation for establishing a bearer for the PDP context. The bearer is called a radio access bearer (RAB) between the SGSN 415 and the terminal 405, and is called a radio bearer (RB) between the RNC 410 and the terminal 405.

The SGSN 415 transmits a RAB establishing message to the RNC 410 in order to establish the bearer for the PDP context in step 435. If the terminal 405 has transmitted the PDP context establishing message 430 including the codec type formation set as 'AMR', the SGSN 415 transmits the RAB establishing message including a set of payload sizes corresponding to the AMR type. The set of payload sizes is a parameter allowing the RNC 410 to calculate a suitable packet size and may employ the following values in the case of the AMR codec.

set of payload sizes=[56 bits, 112 bits, 120 bits, 128 bits, 144 bits, 160 bits, 176 bits, 216 bits, 256 bits]

The SGSN 415 may store codec types and sets of payload sizes corresponding to the codec types in advance, or insert a set of payload sizes corresponding to a codec type reported by the terminal 405 through the codec type information into the RAB establishing message to be transmitted.

In another scheme in accordance with an embodiment of the present invention, the terminal 405 may directly insert information about the set of payload sizes into the PDP context establishing message to be transmitted. In this case, it is unnecessary for the SGSN 415 to store a codec type and information about the set of payload sizes in advance, and the SGSN 415 may use the information about the 'set of payload sizes' delivered from the terminal 405 as it is.

In step 440, upon receiving the RAB establishing message, the RNC 410 makes a set of RLC PDU sizes based on the set of payload sizes. The RLC PDU denotes a packet output from the RLC layer and has a size corresponding to the size of a packet actually transmitted/received between the RNC 410 and the terminal 405. The RNC 410 inserts the sizes of RLC PDUs determined in step 445 into the RB establishing message to be transmitted to the terminal 405.

Figure 5:
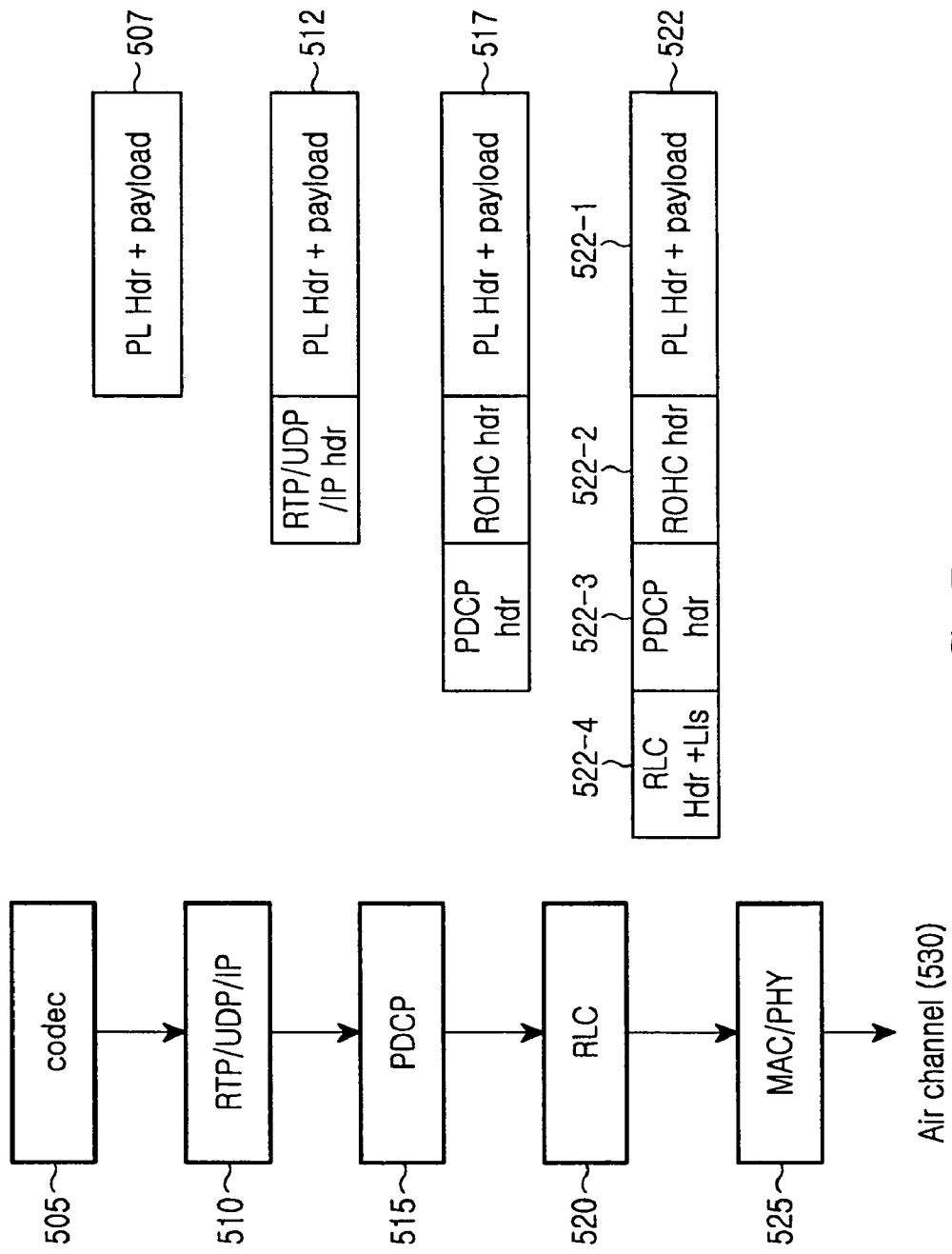
FIG. 5 illustrates the operation of the RNC forming packet data according to the first embodiment of the present invention.

FIG. 5 illustrates the operation of the RNC making a packet data, that is, an RLC PDU according to the first embodiment of the present invention.

Data 507 generated from a codec 505 includes a payload header and a payload, and the size thereof is uniformly set in each codec mode.

Figure 3:
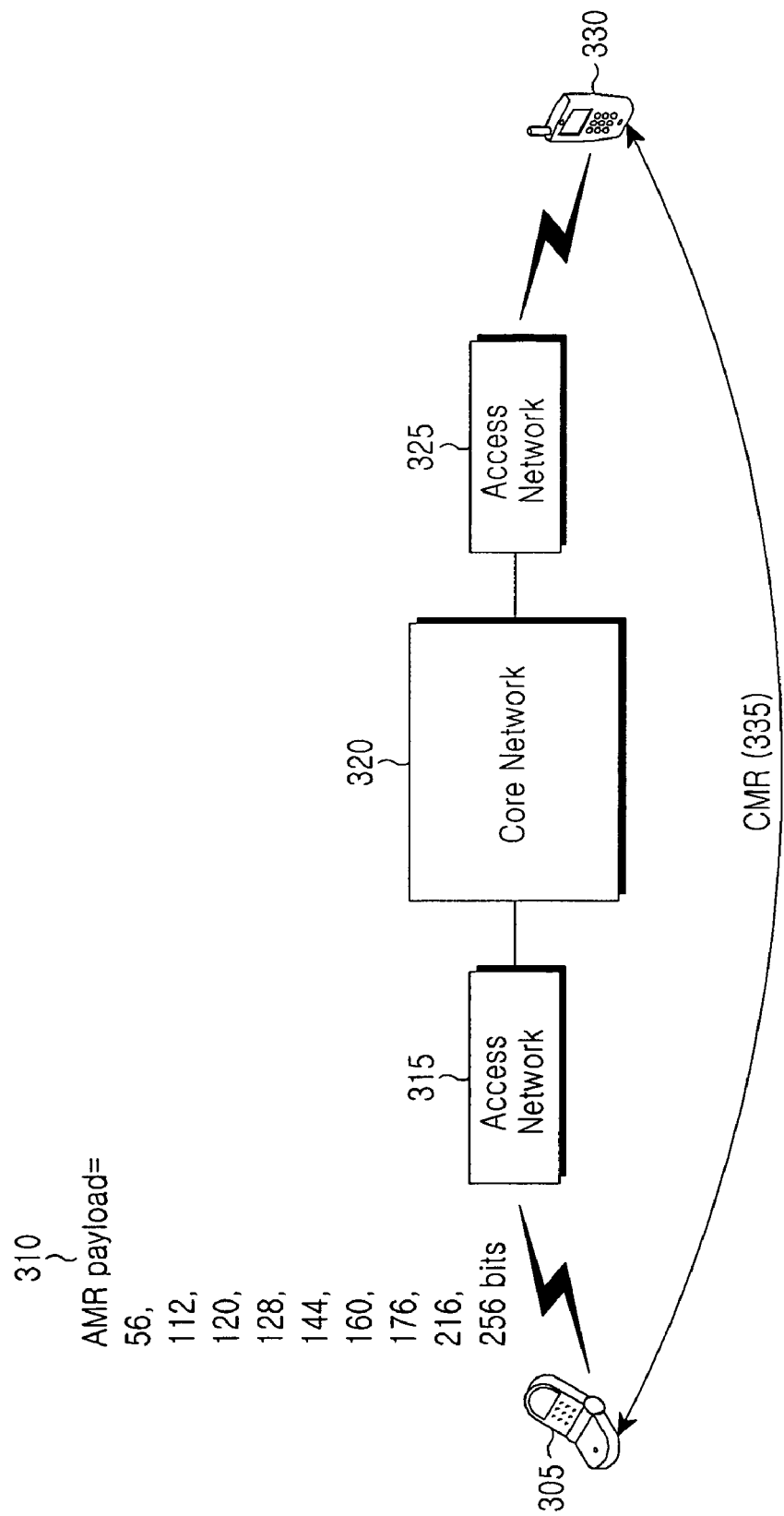
FIG. 3 illustrates a structure of a conventional VoIP mobile communication system using an adaptive multi-rate codec.

The payload header includes a CMR field and a frame type (FT) field expressing a codec mode of the payload described with reference to FIG. 3. In addition, the set of payload sizes has values based on both the payload and the payload header. In this case, the VoIP mobile communication system processes the packet data in an RTP/UDP/IP layer, and the packet data is made into a VoIP packet 512 in the RTP/UDP/IP layer 510. The VoIP packet is made by adding an IP/UDP/RTP header to the data 507 generated from the codec.

The IP/UDP/RTP header of the VoIP packet is compressed in a PDCP layer 515, and a PDCP header is attached to the VoIP packet. In this case, the IP/UDP/RTP header may be compressed through a robust header compression (ROHC) protocol, so that the IP/UDP/RTP header is converted into an ROHC header having several bytes. Accordingly, a packet data including a compressed header has the structure shown of packet 517.

The packet 517 including the compressed header is made into an RLC PDU 522 through the RLC layer 520, and is then transmitted to a radio channel 530 through a MAC layer/PHY layer 525.

The size of the RLC PDU 522 may be determined by the following four factors:

1) Data 522-1 generated from a codec: a data size has a fixed value in each codec mode. In addition, a codec such as an AMR codec supporting multi-rates has a fixed value in each codec mode;

2) A compressed IP/UDP/RTP header 522-2: this header has a variable value according to an operation mode of the ROHC protocol and other parameters;

3) A PDCP header 522-3: the PDCP header may be included in the RLC PDU 522 or not. This determination is achieved by the RNC; and 4) An RLC header and length indicator 522-4: the RLC header includes a 7-bit serial number, 1-bit extension bit, and 2 length indicators. In the VoIP session, the RLC header and the length indicator have constant sizes.

The RNC calculates the possible size of the RLC PDU through Equation (1) in consideration of the factors.

Set of RLC PDU sizes=the size of both the RLC header and the length indicator+the size of the PDCP header+a representative value of the size of the compressed IP/UDP/RTP header+set of payload sizes     Equation (1)

The size of the RLC header and the length indicator is variable according to cases, but generally has 3 bytes. In addition, if the PDCP header is not included in the RLC PDU, the size of the PDCP header is 0 bytes. If the PDCP header is included in the RLC PDU, the size of the PDCP header is 1 byte. Accordingly, if the RNC employs the PDCP header in the VoIP radio bearer, the size of the PDCP header in Equation (1) is considered as 1 byte. Otherwise, the size of the PDCP header is considered as 0 bytes.

In addition, although the size of the IP/UDP/RTP header is variable, a compressed header that is used most frequently employs an R-O header or an R-O-CRC header in a reliable (R) mode of the ROHC scheme. In a uni-directional (U) mode or an optimistic (O) mode, the compressed header employs an U/O-O header. The sizes of the headers vary depending on the size of an identification value, that is, a context ID (CID). If the CID is set to '0', the size of the R-O header or the U/O-O header is 3 bytes, and the size of the R-O-CRC header is 4 bytes. For reference, the sizes of the headers include the size of an UDP checksum field.

In the IPv6, a 2-byte UDP checksum field is preferably always included in the IP/UDP/RTP header. However, since the UDP checksum field is not compressed, the UDP checksum field is included in the compressed IP/UDP/RTP header as it is.

The RNC substitutes a suitable value according to the compression mode of the ROHC header to be employed for the VoIP radio bearer for Equation (1). For example, if the RNC plans to use the R mode, the representative value of the compressed IP/UDP/RTP header size may have 4 bytes. The set of payload sizes is a value delivered from the core network in step 435 of FIG. 4.

If for example, it is assumed that the size of the RLC header and the length indicator has 3 bytes, the size of the PDCP header has 1 byte, and the representative value of the compressed IP/UDP/RTP header size has 4 bytes, the set of the RLC PDU sizes for the ARM codec is as follows.

set of the RLC PDU sizes=[120 bits, 176 bits, 184 bits, 192 bits, 208 bits, 224 bits, 240 bits, 280 bits, 320 bits]

The RNC inserts the sizes of the RLC PDUs determined through the above-described procedure into the radio bearer establishing message to be transmitted to the terminal.

If the types of RLC PDU sizes are excessive, only several types may be used. For example, although an AMR codec having a 3-byte RLC header and length indictor, a 1-byte PDCP header, and a representative 4-byte compressed IP/UDP/RTP header employs nine types of RLC PDU sizes, the AMR codec may use an 192-bit RLC PDU and a 320-bit RLC PDU among the types of the RLC PDU sizes. In this case, the RNC inserts the two types of RLC PDU sizes into the radio bearer establishing message.

The terminal establishes the radio bearer according to the indication of the radio bearer establishing message and then transmits a VoIP packet through the radio bearer. If a VoIP packet is generated, the terminal inserts the VoIP packet into an RLC PDU having the most suitable size among the defined RLC PDU sizes and transmits the RLC PDU. Through the selection of the most suitable size, it is possible to prevent the occurrence of unnecessary padding.

Figure 6:
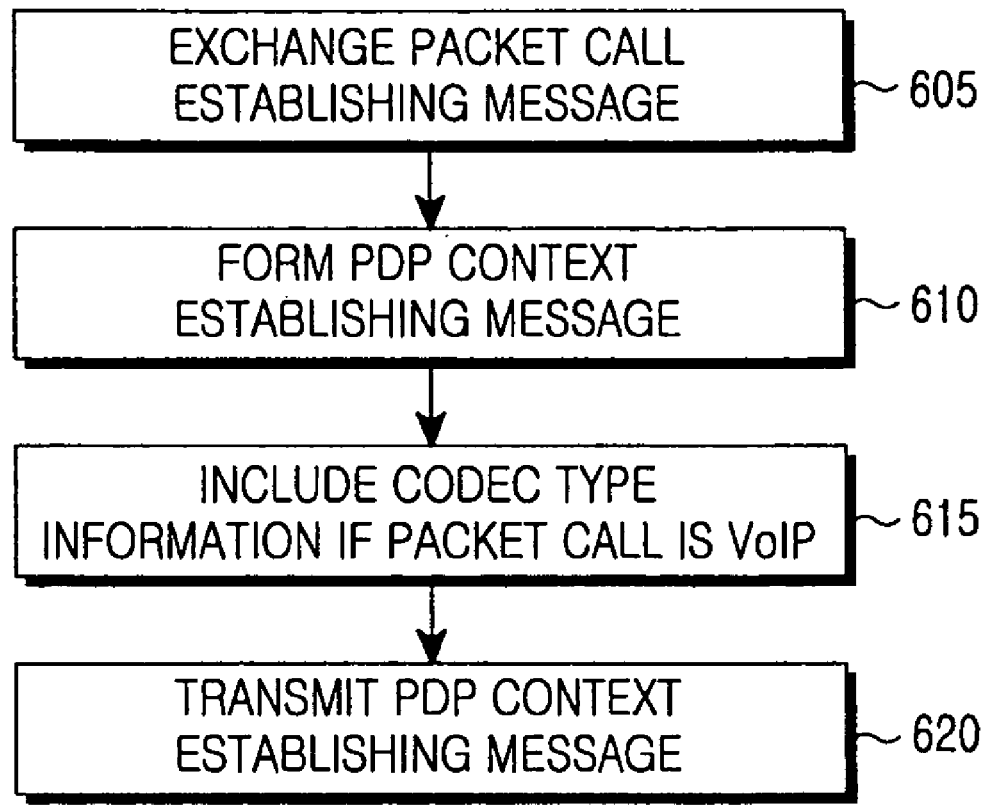
FIG. 6 is a flowchart illustrating the operation of a terminal according to the first embodiment of the present invention.

FIG. 6 is a flowchart illustrating the operation of the terminal 405 according to the first embodiment of the present invention.

In step 605, the terminal exchanges a packet call establishing message with the core network. The packet call may have several types, such as an IP multimedia call and an HTTP call.

The terminal recognizes information used for establishing the packet call through the exchange of the packet call establishing message and forms a PDP context establishing message in order to establish a bearer for the packet call in step 610. The PDP context establishing message includes information required for establishing the bearer including QoS information and a requested bandwidth.

If the packet call is a VoIP call, the terminal inserts codec type information into the PDP context establishing message in step 615. The codec type information includes a codec type detected through the SDP. The VoIP call is established through the SIP as described above, and parameters relating to a session are exchanged through the SDP. The SDP parameters include information allowing the terminal to determine if the packet call is a VoIP call.

For example, if a media type parameter among the SDP parameters indicates audio, the terminal may regard the session as a VoIP session. In addition, the terminal may insert payload size set information into the PDP context establishing message. In this case, the SGSN delivers the payload size set information delivered by the terminal to the RNC.

Thereafter, if the PDP context establishing message is completed as described above, the message is transmitted to the core network in step 620.

Figure 7:
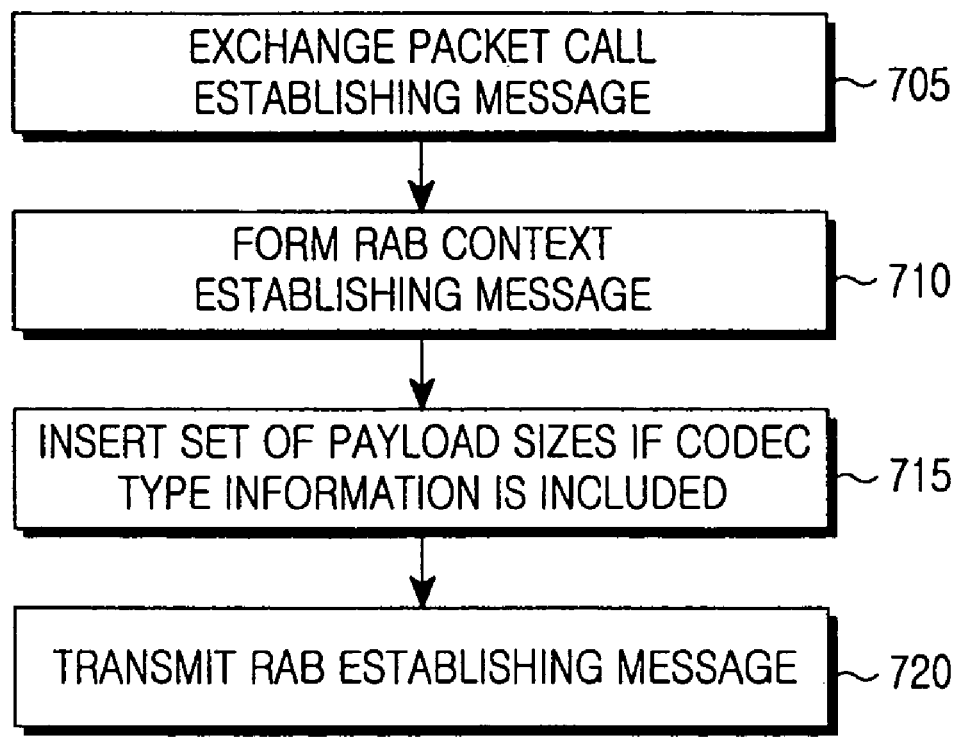
FIG. 7 is a flowchart illustrating the operation of the core network according to the first embodiment of the present invention.

FIG. 7 is a flowchart illustrating the operation of the core network 415 according to the first embodiment of the present invention.

If the SGSN receives the PDP context establishing message from the terminal in step 705, the SGSN sets up the PDP context based on the PDP context establishing message.

In step 710, the SGSN forms an RAB establishing message in order to establish a bearer. The RAB establishing message includes QoS information to be employed for the bearer.

If codec type information is included in the PDP context establishing message in step 705, the SGSN inserts information about a set of payload sizes corresponding to the codec type information into the RAB establishing message in step 715. Generally, the codec type relates to the payload size, and the SGSN may manage codec types and payload sizes using a database. If the information about a set of payload sizes is included in the PDP context establishing message, the SGSN inserts the information about a set of payload sizes into the RAB establishing message. In step 720, the SGSN transmits the RAB establishing message made through the above-described procedure to the RNC.

Figure 8:
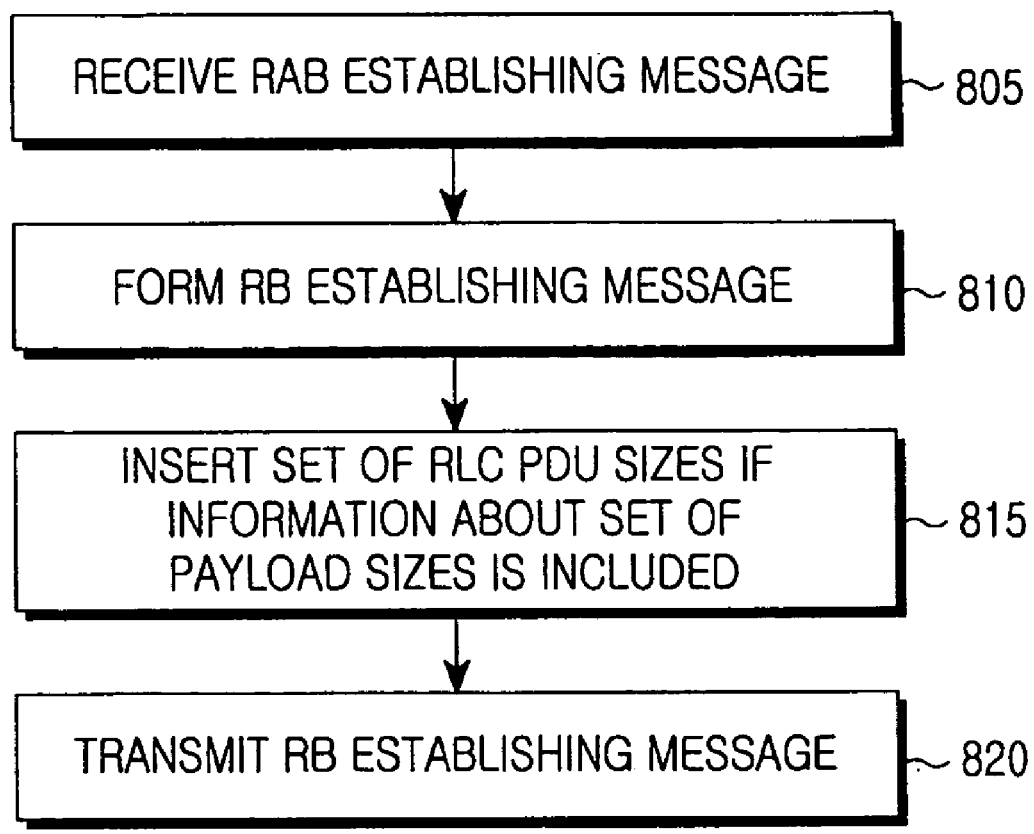
FIG. 8 is a flowchart illustrating the operation of an RNC according to the first embodiment of the present invention.

FIG. 8 is a flowchart illustrating the operation of the RNC 410 according to the first embodiment of the present invention.

If the RNC receives the RAB establishing message from the SGSN in step 805, the RNC establishes the RAB based on the RAB establishing message and determines radio bearer configuration information. The radio bearer configuration information may include PDCP configuration information and information relating to the ROHC. The PDCP configuration information may indicate if the PDCP header is set or not. The information relating to the ROHC may include an ROHC operation mode and a CID to be used.

In step 810, the RNC forms the RB establishing message based on the determined radio bearer configuration information.

If information about a set of payload sizes is included in the RAB establishing message, the RNC calculates the set of RLC PDU sizes through Equation (1) based on the information and inserts the calculated value into the RB establishing message in step 815. In step 820, the RNC transmits the RB establishing message to the terminal.

As described above, according to the first embodiment of the present invention, the terminal informs the SGSN of a codec type and the SGSN determines a payload size corresponding to the codec type and then informs the RNC of information about the payload. The RNC calculates the size of an RLC PDU based on the payload size and the radio bearer established. Thereafter, a VoIP packet is inserted into the RLC PDU to be transmitted/received.

As described above, a size of an RLC PDU suitable for including a VoIP packet is determined, thereby preventing unnecessary padding and raising the efficiency of radio resources.

Second Exemplary Embodiment of the Present Invention

According to the second embodiment of the present invention, a method is provided for reducing unnecessary padding through signal exchange between a terminal and a SGSN. The second embodiment of the present invention is designed in consideration of the fact that a typical 328-bit RLC PDU is efficiently employed for a 12.2 kbps AMR codec mode, but inefficiently employed for another AMR codec mode.

According to the second embodiment of the present invention, an SGSN may order a terminal to fix an AMR codec mode at a rate of 12.2 kbps or not to operate at multi-rates. Through the order, it is possible to remove a side effect derived from the change of a codec mode.

Figure 9:
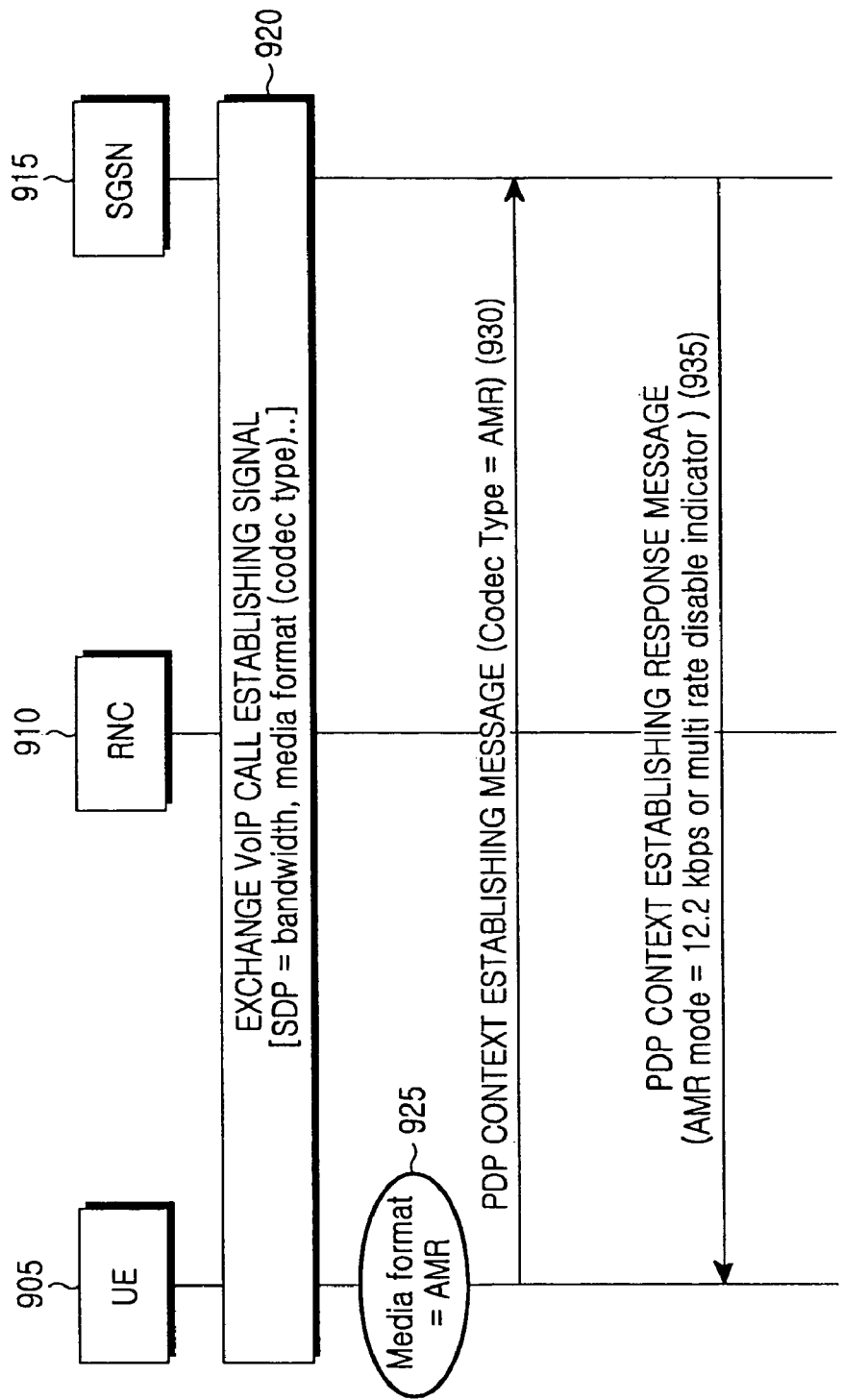
FIG. 9 is a signal flowchart of an overall network setting the size of packet data according to a second embodiment of the present invention.

FIG. 9 is a signal flowchart of an overall network setting the size of packet data according to the second embodiment of the present invention. The network comprises at least a user equipment (UE) 905, a radio network controller (RNC) 910 and a GPRS supporting node (SGSN) 915.

In step 920, the terminal 905 exchanges a VoIP session establishing message with a call controlling device (not shown) of the core network (SGSN) 915. In this case, the VoIP session may be established using a session initiation protocol (SIP). Herein, the call controlling device may be an SIP server.

The terminal 905 exchanges predetermined messages with the SIP server, thereby establishing the VoIP session. The messages include session description protocol (SDP) parameters, and the SDP parameters may be parameters relating to call characteristics such as a requested bandwidth and a codec type.

In step 925, the terminal 905 determines if the codec type of the call detected in the procedure of establishing a call is an AMR codec. If the codec type of the call detected in the procedure of establishing a call is an AMR codec, the terminal 905 sets codec type information of a packet data protocol (PDP) context establishing: message to 'AMR' and transmits the PDP context establishing message in step 930.

In step 935, the SGSN 915 establishes a PDP context by receiving the PDP context establishing message and transmits a response message for the PDP context establishing message to the terminal 905. In this case, the SGSN 915 reports to the terminal 905 that the PDP context establishing message includes the codec type information and the codec type information indicates an AMR codec. In step 935, the SGSN inserts information about an order of multi-rate support prohibition into the transmitted response message. Through the order information, the SGSN 915 may order the terminal 905 to perform a specific AMR mode, or may directly order the terminal 905 not to perform a multi-rate operation.

For example, the SGSN 915 may insert information ordering the terminal 905 to operate only in the 12.2 kbps AMR mode, or may insert a multi-rate disable indicator ordering the terminal 905 not to support multi-rates, into the PDP context establishing response message.

The terminal 915 receives the PDP context establishing response message and operates according to the indication information. That is, if the indication information indicates that only the operation of a specific rate is ordered, the terminal 915 disregards a CMR value of a VoIP packet transmitted from a counterpart of the terminal 915, the terminal 915 generates a VoIP packet according to the AMR mode by using only the specific rate.

In contrast, if the PDP context establishing response message has the multi-rate disable indicator, the terminal 915 maintains an initially set AMR rate even though the CMR value of the VoIP packet transmitted by the counterpart changes.

Third Exemplary Embodiment of the Present Invention

A notable characteristic of the AMR codec is that it can make voice data with a variable size according to the environment of the radio channel. This is called an 'AMR mode' in the AMR codec, and the AMR codec has eight AMR modes as defined below in Table 1.

TABLE 1

| AMR codec modes | Payload sizes | AMR packet size in BE mode | AMR packet size in OA mode |
| --- | --- | --- | --- |
| SID | 39 bits | 56 bits | 56 bits |
| 4.75 kbps | 95 bits | 112 bits | 112 bits |
| 5.15 kbps | 103 bits | 120 bits | 120 bits |
| 5.90 kbps | 118 bits | 128 bits | 136 bits |
| 6.70 kbps | 134 bits | 144 bits | 152 bits |
| 7.40 kbps | 148 bits | 160 bits | 168 bits |
| 7.95 kbps | 159 bits | 176 bits | 176 bits |
| 10.2 kbps | 204 bits | 216 bits | 224 bits |
| 12.2 kbps | 244 bits | 256 bits | 264 bits |

In Table 1, a silent description (SID) represents a packet generated in a silent period.

An AMR packet generated according to modes has a variety of sizes of between 112 bits to 224 bits.

The AMR packet denotes data 507 generated from the codec 505 shown in FIG. 5, and includes a payload header and a payload. The payload header has the size of 10 bits, and the payload has a variable size according to a codec mode.

Since the VoIP supports packet communication, it is necessary to make the AMR packet based on a byte unit. In this case, two schemes including a bandwidth efficient (BE) scheme and an octet aligned (OA) scheme are employed according to embodiments of the present invention.

According to the BE scheme, the payload header is attached to the payload, and then padding bits are inserted into the rear part of the packet, thereby byte-aligning the packet. For example, a 244-bit payload is generated in the 12.2 kbps mode. The packet has the size of 254 bits if a 10-bit payload header is attached to the 244-bit payload. The 254 bits may become 256 bits corresponding to 32 bytes when it is converted based on a byte unit. According to the OA scheme, the payload header and the payload are individually byte-aligned. For example, a 244-bit payload is generated in the 12.2 kbps mode, and the 244-bit payload becomes a 31-byte payload if the 244-bit payload is adjusted based on a byte unit. In addition, if a 10-bit payload header is adjusted based on a byte unit, the 10-bit payload becomes a 2-byte payload header. Accordingly, the size of the 12.2 kpbs AMR packet according to the OA scheme becomes 33 bytes, that is, 264 bits.

As described above, depending on whether the scheme of adjusting the size of a packet based on a byte unit is the BE scheme or the OA scheme, the size of the AMR packet is varied. Therefore, while the terminal informs the SGSN of codec type information, the terminal preferably must inform the SGSN of whether the scheme of adjusting the size of a packet based on a byte unit is the BE scheme or the OA scheme.

In addition, in the VoIP communication, the AMR codec mode may be set according to calls such that only several modes are employed instead of the usage of all modes. If only several modes for the AMR codec are employed as described above, information about a supported AMR codec mode preferably must be reported to the network also.

Accordingly, the third embodiment of the present invention suggests a method of reporting information about a scheme of adjusting the size of packet data based on a byte unit and information about a supported AMR codec mode to the network, and setting the size of the packet data based on the information.

Figure 10:
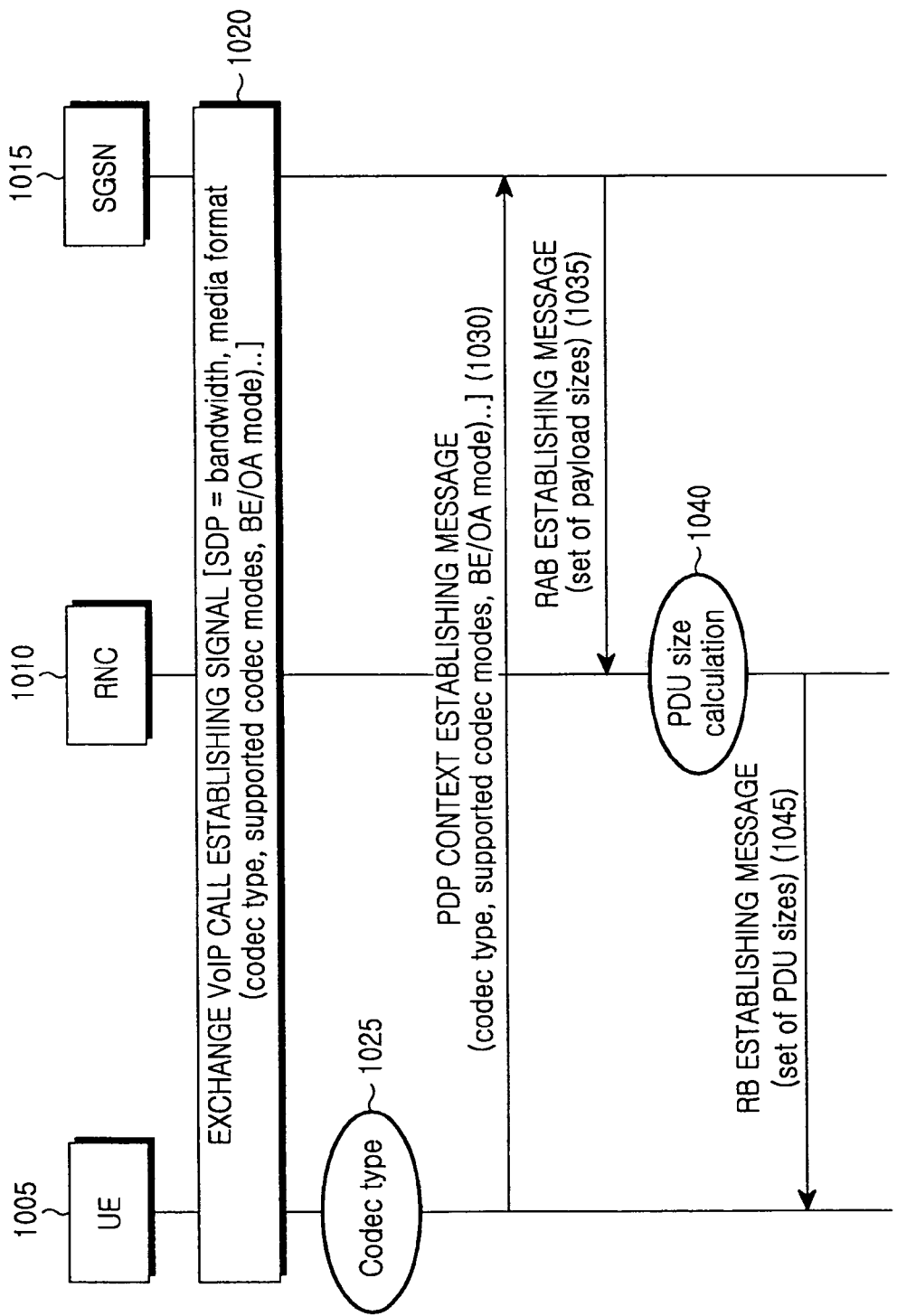
FIG. 10 is a signal flowchart of an overall network setting the size of packet data according to a third embodiment of the present invention.

FIG. 10 is a signal flowchart of an overall network setting the size of packet data according to the third embodiment of the present invention. The network comprises at least a user equipment (UE) 1005, a radio network controller (RNC) 1010 and a GPRS supporting node (SGSN) 1015.

In step 1020, the terminal 1005 exchanges a VoIP session establishing message with a call controlling device (not shown) of the core network (SGSN) 1015. In this case, the VoIP session may be established using a session initiation protocol (SIP). Herein, the call controlling device may be an SIP server.

The terminal 1005 exchanges predetermined messages with the SIP server, thereby establishing the VoIP session. The messages for establishing the session include session description protocol (SDP) parameters, and the SDP parameters may be parameters relating to call characteristics such as a requested bandwidth, a codec type and information about a scheme of byte-aligning an AMR packet (BE/OA information). If a codec type is 'AMR', the information about a supported AMR codec mode in the call is included in the SDP parameter also.

In step 1025, the terminal 1005 recognizes codec type information, BE/OA information, and AMR codec mode information through the SDP parameter of the call detected in the call establishing procedure of step 1020. In step 1030, the terminal 1005 transmits a PDP context establishing message including a codec type of the call, the BE/OA information and the supported codec modes. The PDP context has information relating to a specific session and established together with a bearer used for processing the session.

The PDP context has parameters relating to requested quality of service (QoS) information or security of the session. If the SGSN 1015 receives the PDP context establishing message from the terminal 1005, the SGSN 1015 establishes the PDP context and carries out the operation for establishing a bearer for the set-up PDP context. The bearer is called a 'radio access bearer (RAB)' between the SGSN 1015 and the terminal 1005, and called a 'radio bearer (RB)' between the RNC 1010 and the terminal 1005.

In step 1035, the SGSN 1015 transmits an RAB establishing message to the RNC 1010 in order to establish a bearer for the PDP context. If the terminal 1005 has transmitted a PDP context establishing message in step 1030 having codec type information set to 'AMR', the SGSN 1015 transmits an RAB establishing message having a set of payload sizes corresponding to the AMR codec type. The set of payload sizes denotes a parameter used for calculating by the RNC 1010 a suitable packet size, and the scheme of determining the set of payload sizes is as follows.

Scheme of Determining the Set of Payload Sizes

A device for determining the set of payload sizes in the SGSN 1015 stores AMR packet sizes in the case of the BE scheme and AMR packet sizes in the case of the OA scheme, according to AMR codec modes in advance. That is, the device stores information as shown in Table 1.

To do so, the device first determines if the scheme of determining the set of payload sizes is the OA scheme or the BE scheme. In the case of the OA scheme, the device uses an 'AMR packet size in OA mode' column, and, in the case of the BE scheme, the device uses an 'AMR packet size in BE mode' column.

The device inserts packet sizes corresponding to ARM codec modes included in the supported codec mode information into the set of payload sizes. In addition, the device preferably always inserts a packet size corresponding to a silent period, that is, the SID into the set of payload sizes. If for example, it is assumed that, "BE/OA=OA" and
"supported codec modes=4.75 kbps, 6.70 kbps, 7.95 kbps, 12.2 kbps", the following set of payload sizes is made.

set of payload sizes=[56 bits, 112 bits, 152 bits, 176 bits, 264 bits]

The 56-bit size is a payload size corresponding to the SID. The 112 bits, 152 bits, 176 bits, and 264 bits are payload sizes corresponding to codec modes of 4.75 kbps, 6.70 kbps, 7.9 kbps and 12.2 kbps, respectively, in the case of the OA scheme.

In another example where it is assumed that,

"BE/OA=BE" and
"supported codec modes=5.15 kbps, 7.40 kbps, and 10.2 kbps", the following set of payload sizes is obtained.

set of payload sizes=[56 bits, 120 bits, 160 bits, 216 bits]

The 56-bit size is a payload size corresponding to the SID. The 120 bits, 160 bits, and 216 bits are payload sizes corresponding to codec modes of 5.15 kbps, 7.40 kbps and 10.2 kbps, respectively, in the case of the BE scheme.

When the set of payload sizes is determined, as shown in FIG. 10, if the terminal informs the SGSN of the BE/OA information and the supported codec mode information, the SGSN may find payload sizes based on the information. According to another scheme according to an embodiment of the present invention, the terminal itself may determine the set of payload sizes using the BE/OA information and the supported codec mode information, and then inform the SGSN of the set of payload sizes through the PDP context establishing message.

In step 1040, if the RNC 1010 receives the RAM establishing message, the RNC 1010 calculates a set of RLC PDU sizes based on the set of payload sizes included in the RAB message. Since a scheme of calculating the set of the RLC PDU sizes is substantially identical to the scheme according to the first embodiment of the present invention, a detailed description thereof will be omitted. In step 1045, the RNC 1010 transmits an RB establishing message including the set of the RLC PDU sizes to the terminal 1005.

Figure 11:
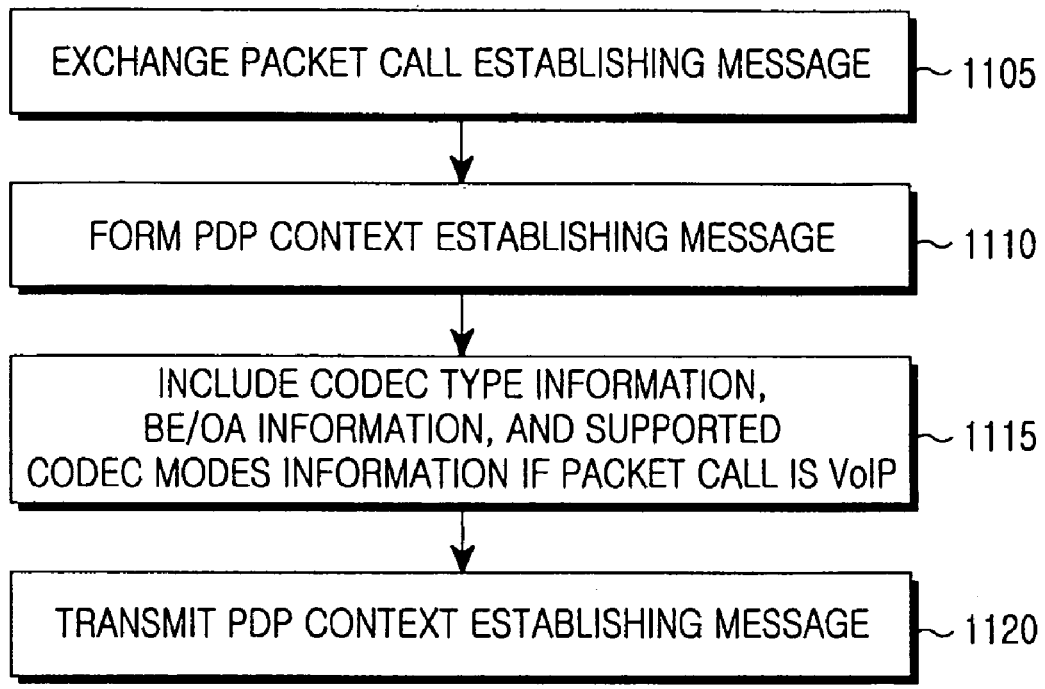
FIG. 11 is a flowchart illustrating the operation of a terminal according to the third embodiment of the present invention.

FIG. 11 is a flowchart illustrating the operation of the terminal 1005 according to the third embodiment of the present invention.

In step 1105, the terminal exchanges a packet call establishing message with the core network. The packet call may have several types such as an IP multimedia call and an HTTP call.

The terminal having recognized information for establishing the packet call through the exchange of the packet call establishing message, forms a PDP context establishing message in order to establish a bearer for the packet call in step 1110. The PDP context establishing message includes information required for establishing the bearer including QoS information, a requested bandwidth, and so forth.

If the packet call is a VoIP call, the terminal inserts codec type information, BE/OA information and supported code mode information into the PDP context establishing message in step 1115. The codec type information, the BE/OA information and the supported code mode information include concerned information detected through the SDP. The VoIP call is established through the SIP as described above, and parameters relating to a session are exchanged through the SDP. The SDP parameters include information allowing the terminal to determine if the packet call is a VoIP call.

For example, if a media type parameter among the SDP parameters indicates audio, the terminal may regard the session as a VoIP session. In addition, the terminal may insert payload size set information into the PDP context establishing message. In this case, the SGSN delivers the payload size set information delivered by the terminal to the RNC.

Thereafter, if the PDP context establishing message is completed as described above, the message is transmitted to the core network in step 1120. The terminal then receives the RB establishing message including the set of the RLC PDU sizes determined by the RNC.

Figure 12:
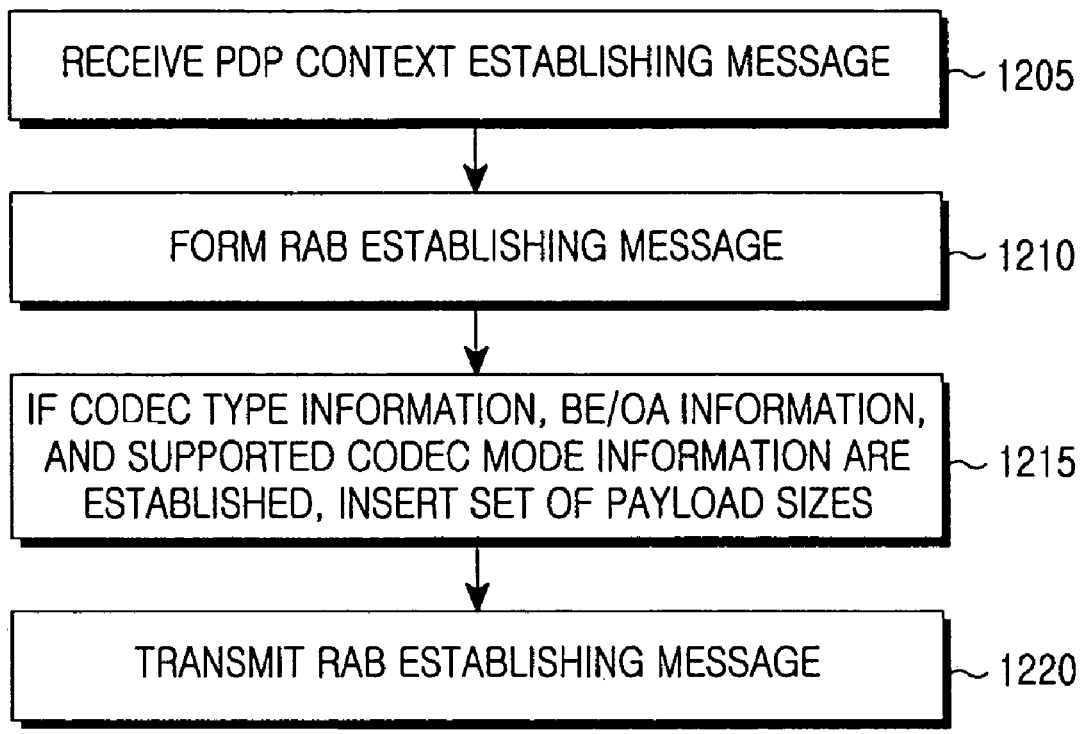
FIG. 12 is a flowchart illustrating the operation of a core network according to the third embodiment of the present invention.

FIG. 12 is a flowchart illustrating the operation of the core network 1015 according to the third embodiment of the present invention.

If the SGSN receives the PDP context establishing message from the terminal in step 1205, the SGSN sets up the PDP context based on the PDP context establishing message.

In step 1210, the SGSN forms an RAB establishing message in order to establish a bearer relating to the PDP context. The RAB establishing message includes QoS information to be employed for the bearer.

If codec type information, BE/OA information and supported codec mode information are included in the PDP context establishing message in step 1205, the SGSN determines the set of the payload sizes according to the above-described scheme and then inserts the set of the payload sizes into the RAB establishing message in step 1215. Generally, a codec type, a BE/OA scheme and a supported codec mode are concerned with a payload size, and the SGSN may manage the codec type and the payload size using a database. If the information about the set of payload sizes is included in the PDP context establishing message, the SGSN inserts the information about a set of payload sizes into the RAB establishing message. In step 1220, the SGSN transmits the RAB establishing message formed through the above-described procedure to the RNC.

Figure 13:
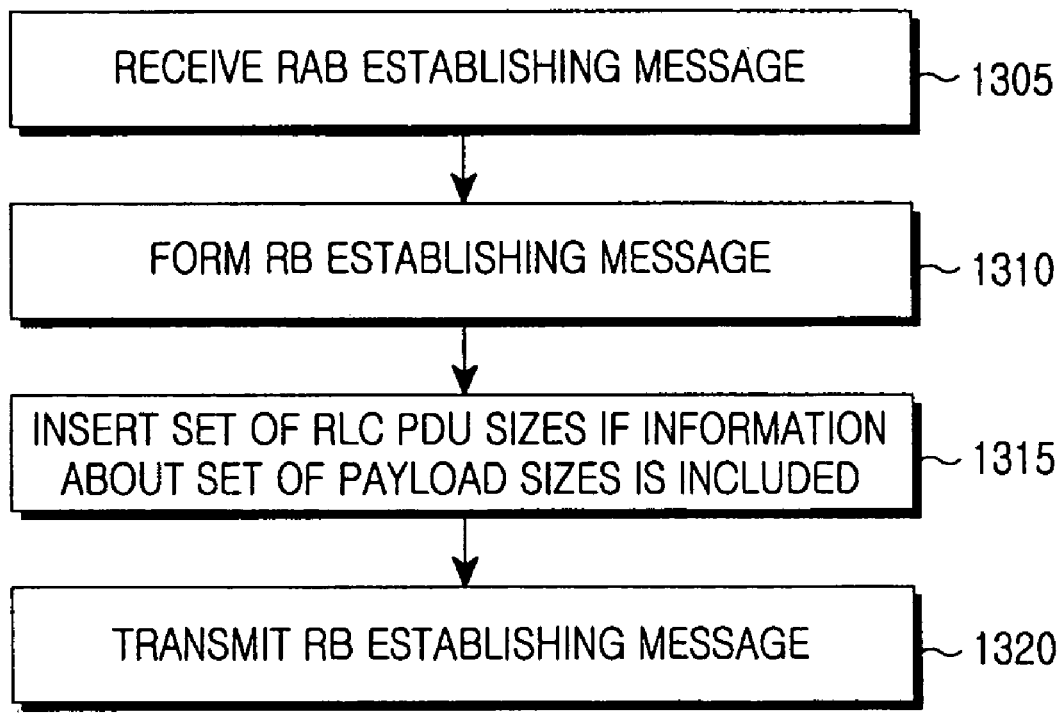
FIG. 13 is a flowchart illustrating the operation of an RNC according to the third embodiment of the present invention.

FIG. 13 is a flowchart illustrating the operation of the RNC 1010 according to the third embodiment of the present invention.

If the RNC receives the RAB establishing message from the SGSN in step 1305, the RNC establishes the RAB based on the RAB establishing message and determines radio bearer configuration information. The radio bearer configuration information may include PDCP configuration information and information relating to the ROHC. The PDCP configuration information may indicate if the PDCP header is set or not. The information relating to the ROHC may include an ROHC operation mode and a CID to be used.

In step 1310, the RNC forms the RB establishing message based on the determined radio bearer configuration information.

If information about a set of payload sizes is included in the RAB establishing message, the RNC calculates the set of RLC PDU sizes through Equation (1) based on the information and inserts the calculated value into the RB establishing message in step 1315. In step 1320, the RNC transmits the RB establishing message to the terminal.

Fourth Exemplary Embodiment of the Present Invention

In an IP multimedia service, multimedia data generated from various types of codecs exists, and packetization intervals having different lengths may be used according to the codecs. The packetization interval denotes a time interval during which various multimedia data is formed into one packet, and one multimedia packet is generated for one packetization interval. In addition, the multimedia data may indicate video data or audio data, but only the audio data will be described as an example according to an embodiment of the present invention.

Generally, the packetization interval of codecs such as a G.722 codec, an adaptive multi-rate (AMR) codec, a qualcomm code excited linear prediction (QCELP) codec, and so forth, has a length of 20 msec. However, several voice codecs have packetization intervals different from the packetization interval of 20 msec. For example, the G.723 has a packetization interval of 30 msec.

A GSM-based UMTS mobile communication system transmits a packet for every transmission time interval (TTI), and the TTI has various sizes such as 10/20/40/80 msec according to call characteristics.

Thus, if the packetization interval according to the IP multimedia communication is not identical to the transmission interval of the UMTS mobile communication system, the transmission efficiency may be degraded.

Figure 14:
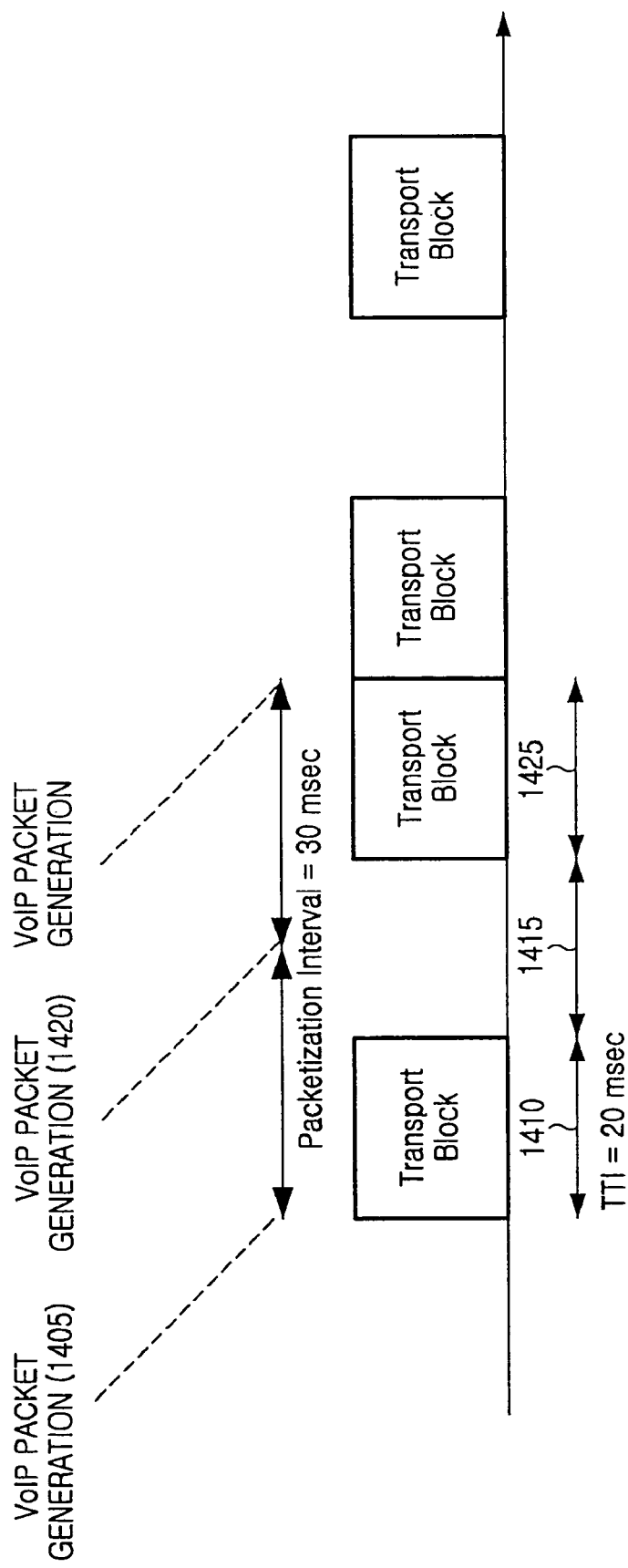
FIG. 14 is a view illustrating a problem in a case in which the transmission interval is not coincident with the packetization interval.

FIG. 14 is a view illustrating a problem in a case in which the transmission interval is not coincident with the packetization interval.

The packetization interval of a predetermined voice codec is 30 msec, and the TTI of a radio channel is 20 msec. If a VoIP packet 1405 is transmitted for one TTI 1410, data is not transmitted in a next TTI 1415. A VoIP packet 1420 generated in the middle point of the TTI 1415 is transmitted in the next TTI 1425. As described above, if the packetization interval is not coincident with the TTI, data is not transmitted during a specific TTI. This causes the inefficient usage of transmission resources.

For example, if the VoIP packet has a size of 300 bits, and a radio channel is designed to transmit a 300-bit transport block during a TTI of 20 msec, data is not transmitted for one TTI 1415 in three consecutive TTIs 1410, 1415 and 1425, thereby causing the inefficient usage of transmission resources.

Accordingly, when an IP multimedia communication system according to the fourth embodiment of the present invention establishes a call, a mobile terminal informs the upper network of a packetization interval according to codec information of the IP multimedia call, and the network determines a TTI of a radio channel most efficiently supporting the packetization interval so as to allocate radio resources. In particular, according to the fourth embodiment of the present invention, the packetization interval according to codec information is delivered from the mobile terminal to the network through signaling together with codec information and byte-alignment information described above.

Figure 15:
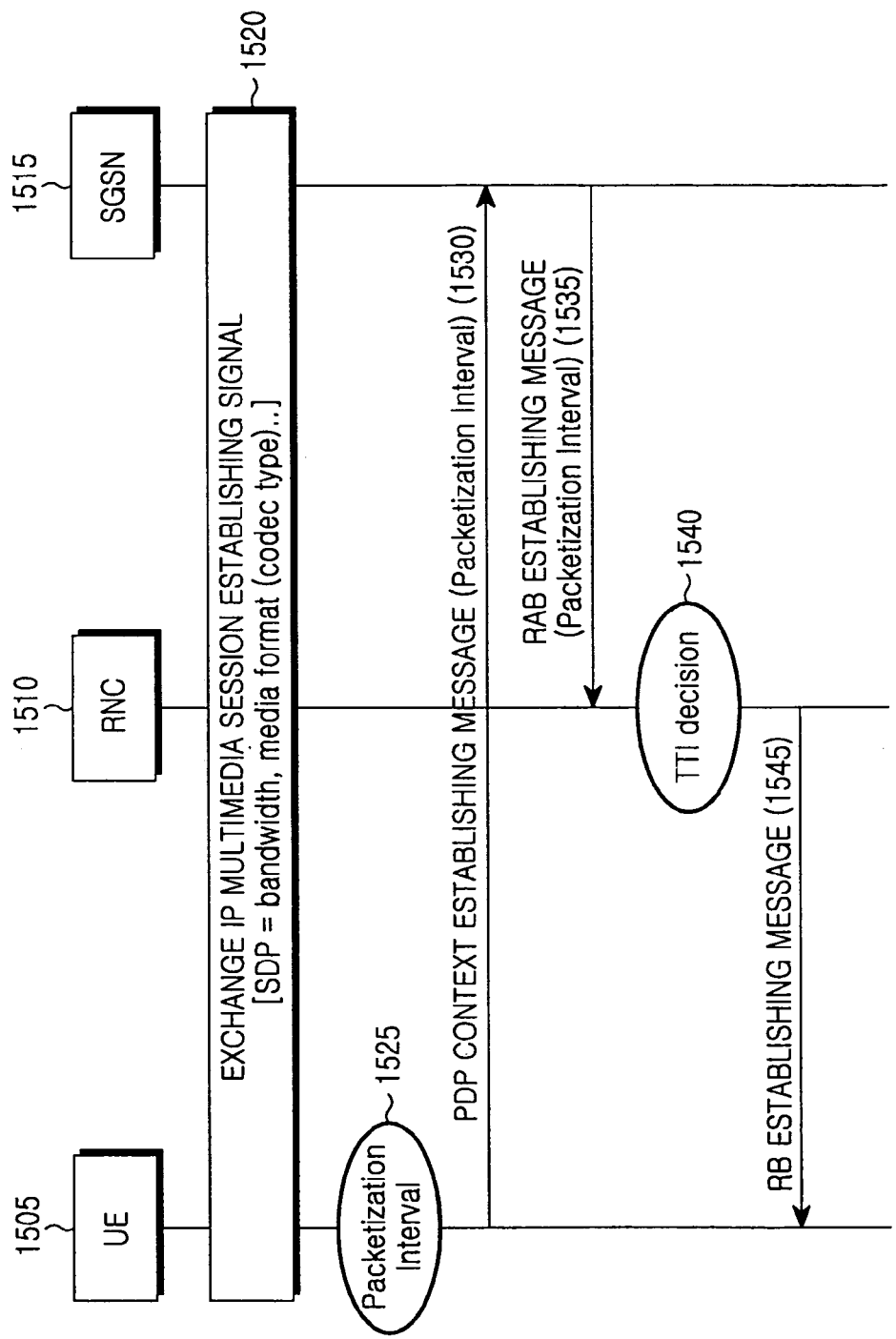
FIG. 15 is a flowchart illustrating a signaling procedure of an overall network for setting a transmission time interval according to a fourth embodiment of the present invention.

FIG. 15 is a flowchart illustrating a signaling procedure of an overall network for setting a transmission time interval according to the fourth embodiment of the present invention. The network comprises at least a user equipment (UE) 1505, a radio network controller (RNC) 1510 and a GPRS supporting node (SGSN) 1515.

In step 1520, the mobile terminal 1505 exchanges an IP multimedia session establishing message with a call controlling device (not shown) of the core network (SGSN) 1515. In this case, the IP multimedia session may be a VoIP session. The IP multimedia session may be established using a session initiation protocol (SIP). Herein, the call controlling device may be an SIP server. The mobile terminal 1505 exchanges a predetermined message with the SIP server, thereby establishing the IP multimedia session. The messages for establishing the session include session description protocol (SDP) parameters. The SDP parameters may be parameters relating to call characteristics such as a requested bandwidth, a media type and a codec type.

The mobile terminal 1505 recognizes a packetization interval through the SDP parameter of the call detected in the call establishing procedure in step 1525. The packetization interval is extracted from a parameter relating to the session recognized through the SDP parameter. For example, the mobile terminal 1505 can recognize the packetization interval using the codec type. As described above, since the packetization interval is determined according to the codec type, the mobile terminal 1505 stores the relationship between its codecs and packetization intervals of the codecs, and then determines a packetization interval corresponding to a codec type of the SDP parameter.

The mobile terminal 1505 inserts the packetization interval into the PDP context establishing message to be transmitted in step 1530. The PDP context establishing message stores information relating to a specific session and is established together with a bearer which will process the session.

The information inserted into the PDP context may be requested Quality of Service (QoS) of the session or a parameter relating to security. If the SGSN receives the PDP context establishing message from the terminal 1505, the SGSN establishes the PDP context and carries out the operation for establishing a bearer for the PDP context. The bearer is called a radio access bearer (RAB) between the SGSN 1515 and the terminal 1505, and called a radio bearer (RB) between the RNC 1510 and the terminal 1505.

The SGSN 1515 transmits the RAB establishing message to the RNC 1510 in order to establish the bearer for the PDP context in step 1535. If the packetization interval is included in the PDP context establishing message 1530, the SGSN 1515 transmits the RAB establishing message including the packetization interval.

If the packetization interval is included in the received RAB establishing message, the RNC 1510 determines a TTI having a length which can most efficiently support the packetization interval in step 1540. For example, if the packetization interval corresponds to 20 msec, the TTI is set to 20 msec.

If there is no TTI having the same value as the packetization interval, the RNC 1510 selects a TTI corresponding to a value obtained by multiplying an integer and a packetization interval, or corresponding to a value obtained by dividing the packetization interval by an integer value.

For example, if the packetization interval is 30 msec and there is no TTI having the same value as the packetization interval, since a length of 10 msec among available TTI lengths is identical to a value obtained by dividing the 30 msec interval by 3, the RNC 1510 employs the length of 10 msec as the TTI.

The RNC 1510 also determines radio bearer configuration information including the determined TTI in step 1540, and transmits a RB establishing message including the information to the mobile terminal 1505 in step 1545.

As described above, the RNC 1510 determines a TTI based on the packetization interval, thereby preventing the inefficient usage of radio resources.

Figure 16:
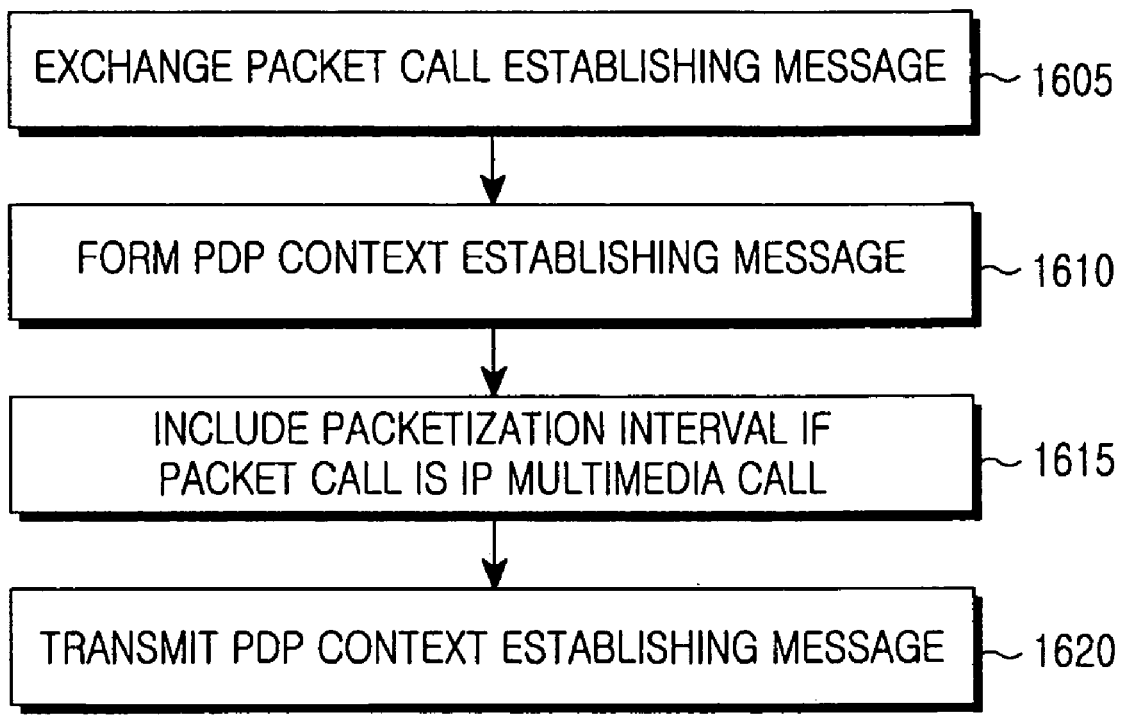
FIG. 16 is a flowchart illustrating the operation of a terminal according to the fourth embodiment of the present invention.

FIG. 16 is a flowchart illustrating the operation of the terminal 1505 according to the fourth embodiment of the present invention.

In step 1605, the mobile terminal exchanges a packet call establishing message with the core network. The packet call may have several types such as an IP multimedia call and an HTTP call.

The mobile terminal having recognized information for establishing the packet call through the exchange of the packet call establishing message, forms a PDP context establishing message in order to establish a bearer for the packet call in step 1610. The PDP context establishing message includes information required for establishing the bearer including QoS information, a requested bandwidth, and so forth.

If the packet call has a packetization interval, for example, if the packet call is the IP multimedia call, the mobile terminal inserts the packetization interval into the PDP context establishing message in step 1615. The packetization interval may be extracted from information relating to the session recognized through the SDP. The PDP context establishing message includes codec type information, byte-alignment information (BE/OA mode) and a voice codec mode.

The IP multimedia call is established through the SIP as described above, and parameters relating to a session are exchanged through the SDP. The mobile terminal can recognize a codec type to be supported in the call through the codec type information among the SDP parameters and a packetization interval of the codec.

If the mobile terminal completes the PDP context establishing message as described above, the mobile terminal transmits the PDP context establishing message to the core network (SGSN) in step 1620.

The mobile terminal then receives an RB establishing message including a TTI from the RNC.

Figure 17:
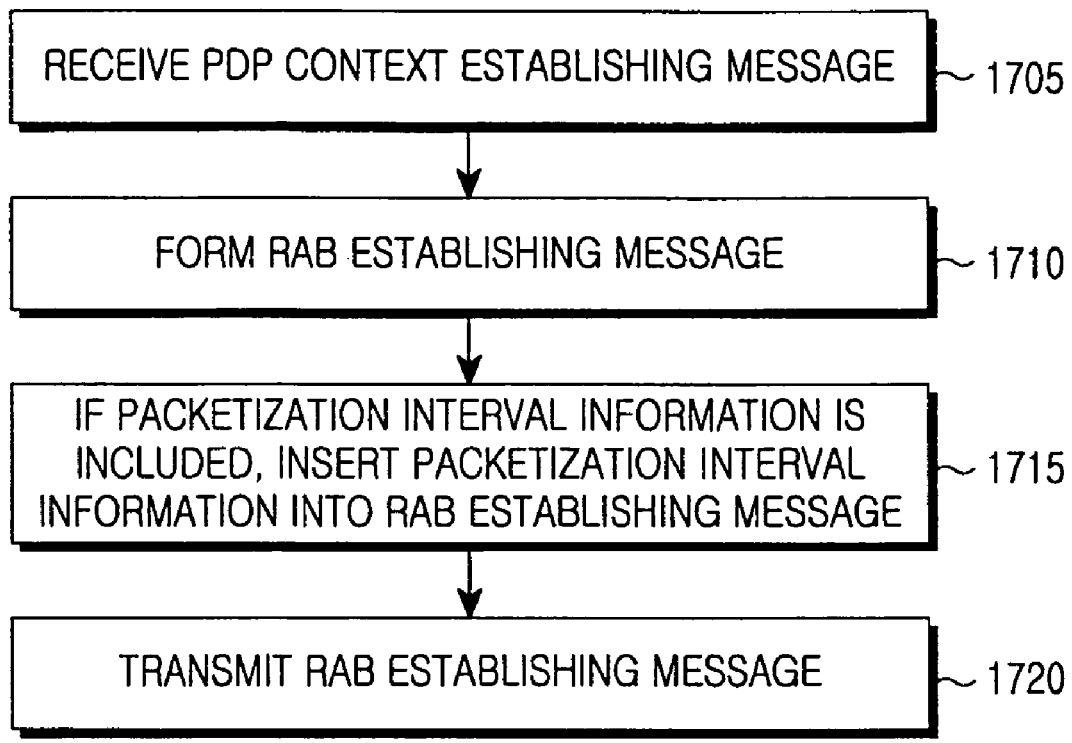
FIG. 17 is a flowchart illustrating the operation of an SGSN according to the fourth embodiment of the present invention.

FIG. 17 is a flowchart illustrating the operation of the SGSN 1515 according to the fourth embodiment of the present invention.

If the SGSN receives the PDP context establishing message from the mobile terminal in step 1705, the SGSN sets up the PDP context based on the PDP context establishing message.

In step 1710, the SGSN forms an RAB establishing message in order to establish a bearer. The RAB establishing message includes QoS information to be employed for the bearer.

If the received PDP context establishing message includes a packetization interval in step 1705, the SGSN inserts information about the packetization interval into the RAB establishing message in step 1715, and transmits the RAB establishing message to the RNC in step 1720. In substantially the same manner, the RAB establishing message may include codec type information, byte-alignment information (BE/OA mode) and a voice codec mode.

Figure 18:
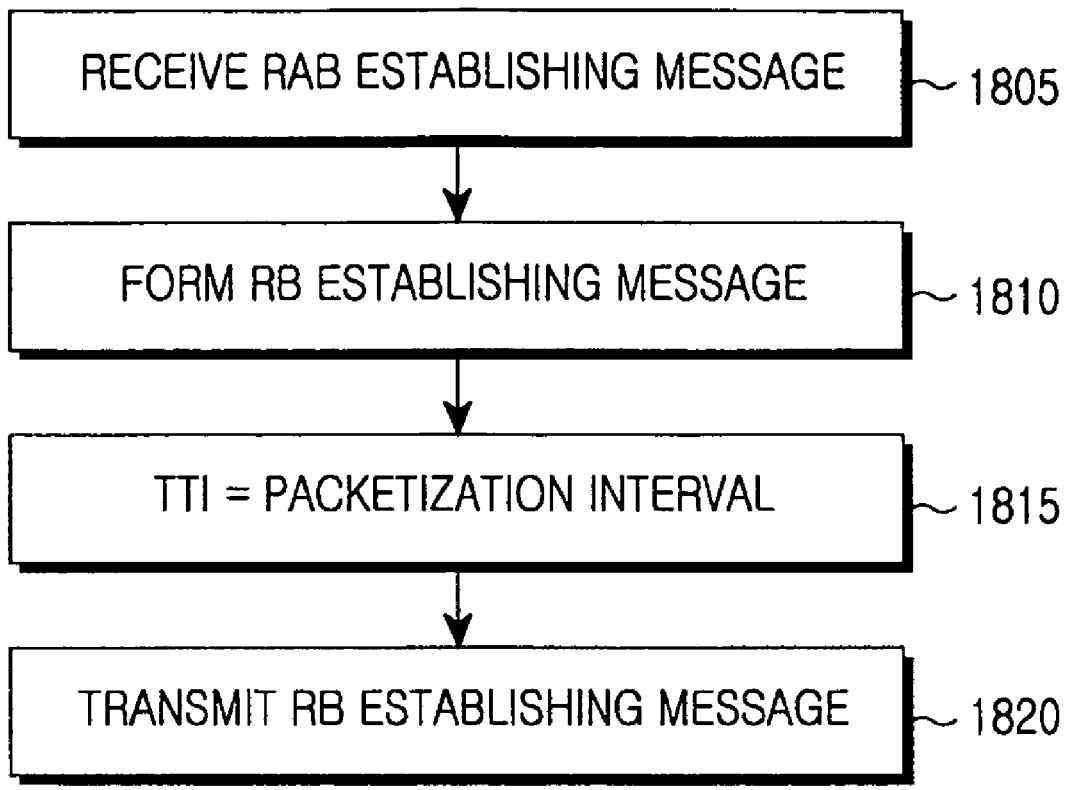
FIG. 18 is a flowchart illustrating the operation of an RNC according to the fourth embodiment of the present invention.

FIG. 18 is a flowchart illustrating the operation of the RNC 1510 according to the fourth embodiment of the present invention.

If the RNC receives the RAB establishing message from the SGSN in step 1805, the RNC establishes the radio access bearer based on the RAB establishing message and determines radio bearer configuration information. The radio bearer configuration information may include PDCP configuration information and information relating to the ROHC. The PDCP configuration information may indicate if the PDCP header is set or not. The information relating to the ROHC may include an ROHC operation mode and a CID to be used.

In step 1810, the RNC forms the RB establishing message based on the determined radio bearer configuration information.

In step 1815, if a packetization interval is included in the RAB establishing message, the RNC determines a TTI based on the packetization interval and inserts the TTI value into the RB establishing message. As described above, the TTI may be equal to the packetization interval, a value obtained by multiplying an integer and the packetization interval, or a value obtained by dividing the packetization interval by an integer. In addition, the RB establishing message may include codec type information, byte-alignment information (BE/OA mode) and a voice codec mode. In step 1820, the RNC transmits the RB establishing message to the terminal.

As described above, according to embodiments of the present invention, the type of codec to be used for a VoIP call between a terminal and a network in a mobile communication system supporting a VoIP is reported and the network is allowed to set the size of a packet to be used for a radio channel in consideration of the size of a payload generated from the codec, so that it is possible to improve the efficiency of radio resources. In addition, a packetization interval according to multimedia data is recognized through a procedure of establishing a radio bearer between a mobile terminal and the network, and a transmission time interval of a packet is set, so that it is possible to improve a transmission efficiency.

While the invention has been shown and described with reference to certain exemplary embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for supporting a voice service through a radio channel in a mobile communication system, the method comprising the steps of:

determining at least one of a voice codec mode, byte-alignment information about a byte-alignment scheme of a voice packet, a requested bandwidth and a codec type used for processing a voice call in a procedure of establishing a call between a terminal and a core network;

forming a packet data protocol context establishing message including at least one of the codec type, the byte-alignment information and the voice codec mode in order to establish a bearer for a packet call;

transmitting the formed packet data protocol context establishing message to the core network from the terminal; and transmitting a radio bearer establishing message from an access network to the terminal, the radio bearer establishing message comprising at least one of a radio link packet size set determined based on the codec type, the byte-alignment information and the voice codec mode, the access network connecting the terminal with the core network, wherein the codec type indicates whether the codec type of the voice call is an adaptive multi-rate codec, and wherein the byte-alignment information represents a bandwidth efficient scheme for byte-aligning an overall size of a header and a payload included in the voice packet, and an octet aligned scheme for individually byte-aligning the header and the payload.

2. The method as claimed in claim 1, wherein the radio link packet size set represents sizes of radio link control protocol data units (RLC PDUs).

3. The method as claimed in claim 1, further comprising a step of:
informing by the terminal, the core network of a payload size set after the terminal determines the payload size set using the codec type, the byte-alignment information and the codec mode information.

4. The method as claimed in claim 1, wherein the packet data protocol context establishing message further comprises a packetization interval during which packet data according to the codec type is generated.

5. The method as claimed in claim 4, wherein the radio bearer establishing message further comprises a transmission time interval of a radio link used for transmitting radio link packet data based on the packetization interval.

6. A method for supporting a voice service through a radio channel in a mobile communication system, the method comprising the steps of:
determining at least one of a voice codec mode, byte-alignment information about a byte-alignment scheme of a voice packet, a requested bandwidth and a codec type used for processing a voice call in a procedure of establishing a packet call between a terminal and a core network;
receiving from the terminal a packet data protocol context establishing message comprising at least one of the codec type, the byte-alignment information and the voice codec mode in order to establish a bearer for the packet call;
forming a radio access bearer establishing message to establish a bearer relating to a packet data protocol context; and
obtaining a payload size set according to the codec type, the byte-alignment information and the voice codec mode and transmitting a radio access bearer establishing message to an access network, which provides a service to the terminal, by inserting the payload size set into the radio access bearer establishing message,
wherein the codec type indicates whether the codec type of the voice call is an adaptive multi-rate codec, and
wherein the byte-alignment information represents a bandwidth efficient scheme for byte-aligning an overall size of a header and a payload included in the voice packet, and an octet aligned scheme for individually byte-aligning the header and the payload.

7. The method as claimed in claim 6, further comprising a step of:
determining by the core network, the payload size set using the codec type information, the byte-alignment information and the codec mode information.

8. The method as claimed in claim 6, further comprising a step of:
receiving from the terminal, the payload size set determined by the terminal based on the codec type information, the byte-alignment information and the codec mode information.

9. The method as claimed in claim 6, wherein the packet data protocol context establishing message and the radio access bearer establishing message further comprise a packetization interval during which packet data is generated according to the codec type.

10. A method for supporting a voice service through a radio channel in a mobile communication system, the method comprising the steps of:
receiving from a core network, a radio access bearer establishing message comprising at least one of a payload size set determined between a terminal and the core network based on a voice codec mode, byte-alignment information about a byte-alignment scheme of a voice packet, a requested bandwidth and a codec type used for processing a voice call;
establishing a radio access bearer according to the radio access bearer establishing message and forming a radio bearer establishing message comprising radio bearer configuration information based on the payload size set included in the radio access bearer establishing message; and
determining packet sizes usable in a radio link according to the payload size set included in the radio access bearer establishing message and transmitting the radio bearer establishing message to the terminal by inserting a radio link packet size set into the radio bearer establishing message, the radio link packet size set representing sizes of packets of the established radio link,
wherein the codec type indicates whether a codec type of the voice call is an adaptive multi-rate codec, and
wherein the byte-alignment information represents a bandwidth efficient scheme for byte-aligning an overall size of a header and a payload included in the voice packet, and an octet aligned scheme for individually byte-aligning the header and the payload.

11. The method as claimed in claim 10, wherein the radio access bearer establishing message further comprises a packetization interval during which packet data is generated according to the codec type.

12. The method as claimed in claim 11, wherein the radio bearer establishing message further comprises a transmission time interval of a radio link used for transmitting radio link packet data based on the packetization interval.

13. A device for supporting a voice service through a radio channel in a mobile communication system, the device comprising:
a user equipment for determining at least one of a voice codec mode, byte-alignment information about a byte-alignment scheme of a voice packet, a requested bandwidth and a codec type used for processing a voice call when the voice call is established and transmitting a packet data protocol context establishing message comprising at least one of the codec type, the byte-alignment information and the voice codec;
a core network for obtaining a payload size set based on the codec type, the byte-alignment information and the voice codec mode by receiving the packet data protocol context establishing message from the user equipment and transmitting a radio bearer establishing message including the payload size set; and
an access network for determining sizes of radio link packets usable in a radio link based on the payload size set by receiving the radio bearer establishing message from the core network and transmitting to the user equipment a radio bearer establishing message comprising a radio link packet size set representing the determined sizes of the radio link packets,
wherein the codec type indicates whether a codec type of the voice call is an adaptive multi-rate codec, and
wherein the byte-alignment information represents a bandwidth efficient scheme for byte-aligning an overall size of a header and a payload included in the voice packet, and an octet aligned scheme for individually byte-aligning the header and the payload.

14. The device as claimed in claim 13, wherein the radio link payload set represents sizes of radio link control protocol data units.

15. The device as claimed in claim 13, wherein the terminal is configured to determine the payload size set using the codec type, the byte-alignment information and the codec mode information and then inform the core network of the payload size set.

16. The device as claimed in claim 13, wherein the core network is configured to determine the payload size set using the codec type, the byte-alignment information and the codec mode information and then inform the access network of the payload size set.

17. The device as claimed in claim 13, wherein the packet data protocol context establishing message and the radio access bearer establishing message further comprise a packetization interval during which packet data is generated.

18. The device as claimed in claim 13, wherein the radio bearer establishing message further comprises a transmission time interval of a radio link used for transmitting radio link packet data based on the packetization interval.

19. A method for supporting a voice service through a radio channel in a mobile communication system, the method comprising the steps of:
  determining codec information for processing a voice call in a procedure of establishing a call between a terminal and a core network;
  transmitting to the terminal from the core network, a packet data protocol context establishing message comprising the codec information and a packetization interval during which packet data is generated according to the codec information;
  obtaining by the core network, the packetization interval based on the packet data protocol context establishing message and transmitting a radio access bearer establishing message comprising the packetization interval to an access network which provides a service to the terminal; and
  determining by the access network, a transmission time interval of a radio link used for transmitting the packet data based on the packetization interval and transmitting a radio bearer establishing message comprising the transmission time interval of the radio link to the terminal,
  wherein the codec information comprises at least one of a voice codec mode, byte-alignment information about a byte-alignment scheme of a voice packet, a requested bandwidth and a codec type, and
  wherein the codec type indicates whether a codec type of the voice call is an adaptive multi-rate codec, and
  wherein the byte-alignment information represents a bandwidth efficient scheme for byte-aligning an overall size of a header and a payload included in the voice packet, and an octet aligned scheme for individually byte-aligning the header and the payload.

20. The method as claimed in claim 19, wherein the transmission time interval of the radio link is substantially identical to the packetization interval.

21. The method as claimed in claim 19, wherein the transmission time interval of the radio link corresponds to a product obtained by multiplying an integer and the packetization interval.

22. The method as claimed in claim 19, wherein the transmission time interval of the radio link is determined as a quotient obtained by dividing the packetization interval by an integer value.

23. The method as claimed in claim 19, wherein the radio access bearer establishing message further comprises a payload size set determined according to the codec information, the byte-alignment information and the codec mode information.

24. The method as claimed in claim 19, wherein the radio bearer establishing message further comprises a radio link packet size set determined according to a payload size set.

25. A device for supporting a voice service through a radio channel in a mobile communication system, the device comprising:
  a user equipment for determining codec information for processing a voice call and transmitting to a core network a packet data protocol context establishing message comprising the codec information and a packetization interval during which packet data is generated according to the codec information when establishing a call with the core network;
  the core network for obtaining the packetization interval from the packet data protocol context establishing message and transmitting a radio bearer establishing message including the packetization interval to an access network which provides a service to the user equipment; and
  the access network for determining a transmission time interval of a radio link used for transmitting the packet data based on the packetization interval and transmitting a radio bearer establishing message comprising the transmission time interval to the user equipment,
  wherein the codec information comprises at least one of a voice codec mode, byte-alignment information about a byte-alignment scheme of a voice packet, a requested bandwidth and a codec type,
  wherein the codec type indicates whether a codec type of the voice call is an adaptive multi-rate codec, and
  wherein the byte-alignment information represents a bandwidth efficient scheme for byte-aligning an overall size of a header and a payload included in the voice packet, and an octet aligned scheme for individually byte-aligning the header and the payload.

26. The device as claimed in claim 25, wherein the transmission time interval of the radio link is substantially identical to the packetization interval.

27. The device as claimed in claim 25, wherein the transmission time interval of the radio link corresponds to a product obtained by multiplying an integer and the packetization interval.

28. The device as claimed in claim 25, wherein the transmission time interval of the radio link is determined as a quotient obtained by dividing the packetization interval by an integer value.

29. The device as claimed in claim 25, wherein the radio access bearer establishing message further comprises a payload size set determined according to the codec information, the byte-alignment information and the codec mode information.

30. The device as claimed in claim 25, wherein the radio bearer establishing message further comprises a radio link packet size set determined according to the payload size set.

* * * * *